US010636422B2

United States Patent
Numata et al.

(10) Patent No.: US 10,636,422 B2
(45) Date of Patent: Apr. 28, 2020

(54) SYSTEM AND CONVERSATION INFORMATION OUTPUT METHOD

(71) Applicant: HITACHI, LTD., Tokyo (JP)

(72) Inventors: Takashi Numata, Tokyo (JP); Toshinori Miyoshi, Tokyo (JP); Hiroki Sato, Tokyo (JP)

(73) Assignee: HITACHI, LTD., Tokyo (JP)

( * ) Notice: Subject to any disclaimer, the term of this patent is extended or adjusted under 35 U.S.C. 154(b) by 104 days.

(21) Appl. No.: 15/861,798

(22) Filed: Jan. 4, 2018

(65) Prior Publication Data

US 2018/0211664 A1 Jul. 26, 2018

(30) Foreign Application Priority Data

Jan. 25, 2017 (JP) .................................. 2017-011144

(51) Int. Cl.
*G10L 15/22* (2006.01)
*G10L 25/63* (2013.01)
(Continued)

(52) U.S. Cl.
CPC .............. *G10L 15/22* (2013.01); *G06F 3/167* (2013.01); *G10L 15/075* (2013.01);
(Continued)

(58) Field of Classification Search
None
See application file for complete search history.

(56) References Cited

U.S. PATENT DOCUMENTS

| 2005/0043956 A1* | 2/2005 | Aoyama | ................. G10L 15/22 704/276 |
| 2007/0094033 A1* | 4/2007 | Nagashima | ............. G10L 15/22 704/272 |

(Continued)

FOREIGN PATENT DOCUMENTS

JP    2013-242763 A    12/2013

OTHER PUBLICATIONS

Matsuyama, Yoichi, et al. "Four-participant group conversation: A facilitation robot controlling engagement density as the fourth participant." Computer Speech & Language 33.1 , pp. 1-24 (Year: 2015).*

(Continued)

*Primary Examiner* — Seong-Ah A Shin
(74) *Attorney, Agent, or Firm* — Volpe and Koenig, P.C.

(57) ABSTRACT

There is provided a system in which empowerment is performed by outputting conversation information to the user, the system including: a computer including a processor, a memory, and an interface; and a measuring device that measures signals of a plurality of types, wherein the processor calculates values of conversation parameters of a plurality of attributes for evaluating a state of a user who performs the empowerment on the basis of a plurality of signals measured by the measuring device, the processor selects a selection parameter which is a conversation parameter of a change target on the basis of the values of the conversation parameters of the plurality of attributes, the processor decides conversation information for changing a value of the selection parameter, and the processor outputs the decided conversation information to the user.

10 Claims, 23 Drawing Sheets

(51) Int. Cl.
*G10L 15/26* (2006.01)
*G10L 17/26* (2013.01)
*G10L 15/07* (2013.01)
*G06F 3/16* (2006.01)

(52) U.S. Cl.
CPC ............ *G10L 15/265* (2013.01); *G10L 17/26* (2013.01); *G10L 2015/227* (2013.01)

(56) References Cited

U.S. PATENT DOCUMENTS

| | | | | |
|---|---|---|---|---|
| 2009/0055190 | A1* | 2/2009 | Filev | G06F 3/011 704/270 |
| 2011/0144999 | A1* | 6/2011 | Jang | G06K 9/00892 704/270.1 |
| 2013/0145240 | A1* | 6/2013 | Anderson | G06F 3/0483 715/201 |
| 2013/0325478 | A1* | 12/2013 | Matsumoto | B60W 50/08 704/274 |
| 2015/0314454 | A1* | 11/2015 | Breazeal | B25J 9/0003 700/259 |
| 2015/0327802 | A1* | 11/2015 | Miyake | A61B 5/11 434/236 |
| 2016/0171180 | A1 | 6/2016 | Yagnyamurthy et al. | |
| 2017/0076740 | A1* | 3/2017 | Feast | G10L 25/63 |
| 2017/0206064 | A1* | 7/2017 | Breazeal | H04N 13/239 |

OTHER PUBLICATIONS

Poh et al. "Advancements in Noncontact, Multiparameter Physiological Measurements Using a Webcam" IEEE Transactions on Biomedical Engineering, pp. 7-11, vol. 58, No. 1, Jan. 2011.

Japanese Office Action dated Jan. 14, 2020 for the Japanese Patent Application No. 2017-011144.

\* cited by examiner

| 401 | 402 | 403 | 404 | 405 | 406 | 407 | 408 | 409 |
|---|---|---|---|---|---|---|---|---|
| ID | OUTPUT CONVERSATION INFORMATION | SELECTION PARAMETER | EMPOWERMENT PARAMETER NAME | PRE-CONVERSATION EMPOWERMENT PARAMETER | POST-CONVERSATION EMPOWERMENT PARAMETER | CONTINUITY PARAMETER NAME | PRE-CONVERSATION CONTINUITY PARAMETER | POST-CONVERSATION CONTINUITY PARAMETER |
| 1 | TEXT 1 | E1 | E1 | 50 | 55 | C1 | 35 | 45 |

| ID (501) | CONTINUITY PARAMETER NAME (502) | CONTINUITY PARAMETER COEFFICIENT (503) |
|---|---|---|
| 1 | C1 | 0.1 |

| EMPOWERMENT PARAMETER NAME (601) | EMPOWERMENT THRESHOLD VALUE (602) | CONTINUITY PARAMETER NAME (603) | CONTINUITY THRESHOLD VALUE (604) |
|---|---|---|---|
| E1 | 60 | C1 | 40 |

| ID 701 | EMPOWERMENT PARAMETER NAME 702 | EMPOWERMENT PARAMETER 703 | CONTINUITY PARAMETER NAME 704 | CONTINUITY PARAMETER 705 | CONVERSATION INFORMATION 706 | SELECTION PARAMETER 707 | PROBABILITY 708 |
|---|---|---|---|---|---|---|---|
| 1 | E1 | 20 | C1 | 30 | TEXT 1 | E1 | 5% |
|   |    |    |    |    | TEXT 2 | E1 | 3% |
|   |    |    |    |    | ... | ... | ... |
|   |    |    |    |    | TEXT m | C1 | 11% |
|   |    |    |    |    | TEXT n | C1 | 6% |
|   |    |    |    |    | ... | ... | ... |
| 2 | ... | ... | ... | ... | ... | ... | ... |

| 801 | 802 | 803 | 804 |
|---|---|---|---|
| ID | SIGNAL NAME | TIME | SIGNAL |
| 1 | S1 | 0.1 | 1 |

| 901 | 902 | 903 | 904 | 905 |
|---|---|---|---|---|
| REFERENCE ID | PROBLEM ID | CONTINUITY PARAMETER NAME | CONTINUITY PARAMETER | FEATURE QUANTITY |
| 1 | 1 | C1 | 30 | 1 |

| 1001 | 1002 | 1003 | 1004 |
|---|---|---|---|
| ID | SIGNAL NAME | TIME | SIGNAL |
| 1 | L1 | 0.1 | 1 |

| REFERENCE ID 1101 | EMPOWERMENT PARAMETER CHANGE AMOUNT 1102 | CONTINUITY PARAMETER CHANGE AMOUNT 1103 | IN-CONVERSATION CONTINUITY PARAMETER 1104 | EMPOWERMENT DETERMINATION RESULT 1105 | CONTINUITY DETERMINATION RESULT 1106 |
|---|---|---|---|---|---|
| 1 | 5 | 10 | 40 | OK | NG |

| ID 1201 | SELECTION PARAMETER NAME 1202 | EMPOWERMENT PARAMETER NAME 1203 | EMPOWERMENT PARAMETER COEFFICIENT 1204 | CONTINUITY PARAMETER NAME 1205 | CONTINUITY PARAMETER COEFFICIENT 1206 |
|---|---|---|---|---|---|
| 1 | E1 | E1 | 0.1 | C1 | 0.1 |

| ID | SELECTION PARAMETER NAME | EMPOWERMENT PARAMETER NAME | PRE-CONVERSATION EMPOWERMENT PARAMETER | CONTINUITY PARAMETER NAME | PRE-CONVERSATION CONTINUITY PARAMETER | EMPOWERMENT ENHANCEMENT CONVERSATION | EMPOWERMENT WEAKENING CONVERSATION | CONTINUITY ENHANCEMENT CONVERSATION | CONTINUITY WEAKENING CONVERSATION |
|---|---|---|---|---|---|---|---|---|---|
| 1301 | 1302 | 1303 | 1304 | 1305 | 1306 | 1307 | 1308 | 1309 | 1310 |
| 1 | E1 | E1 | 1 | C1 | 1 | TEXT A | TEXT B | TEXT C | TEXT D |

| ID (501) | CONTINUITY PARAMETER NAME (502) | CONTINUITY PARAMETER COEFFICIENT (503) |
|---|---|---|
| 1 | C1 | 0.1 |

| ID (501) | EMPOWERMENT PARAMETER NAME (2002) | EMPOWERMENT PARAMETER COEFFICIENT (2003) |
|---|---|---|
| 1 | E1 | 0.25 |

| REFERENCE ID (901) | PROBLEM ID (902) | CONTINUITY PARAMETER NAME (903) | CONTINUITY PARAMETER (904) | FEATURE QUANTITY (905) |
|---|---|---|---|---|
| 1 | 1 | C1 | 30 | 1 |

| REFERENCE ID (901) | PROBLEM ID (902) | EMPOWERMENT PARAMETER NAME (2103) | EMPOWERMENT PARAMETER (2104) | FEATURE QUANTITY (905) |
|---|---|---|---|---|
| 1 | 1 | E1 | 50 | 1 |

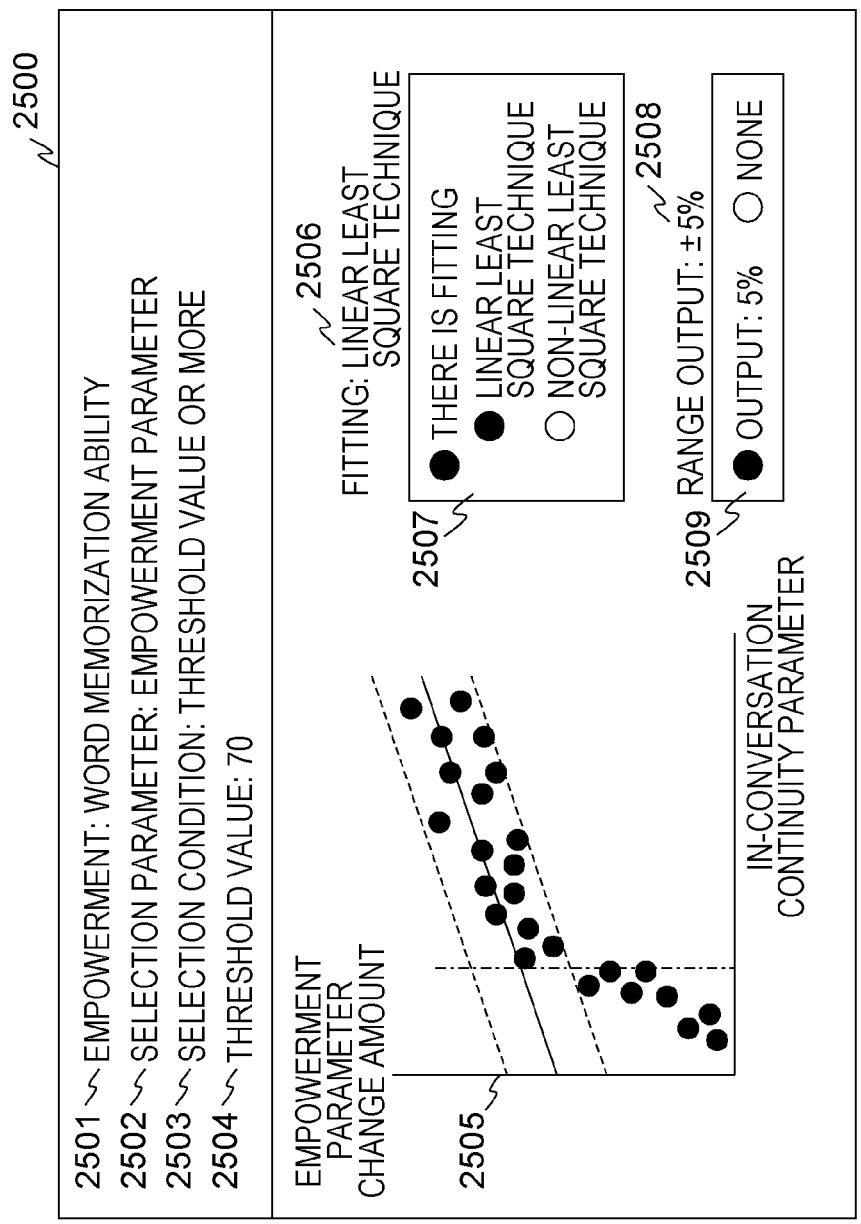

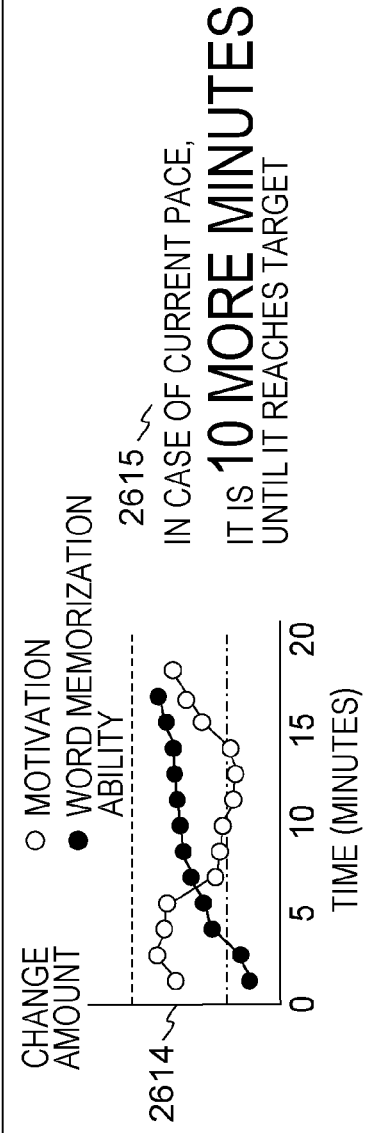

SYSTEM AND CONVERSATION INFORMATION OUTPUT METHOD

CLAIM OF PRIORITY

The present application claims priority from Japanese patent application JP 2017-011144 filed on Jan. 25, 2017, the content of which is hereby incorporated by reference into this application.

BACKGROUND OF THE INVENTION

1. Field of the Invention

The present invention relates to a system in which empowerment is performed by a conversation.

2. Description of the Related Art

Techniques in which, in a system in which empowerment is performed by a conversation, a biometric signal is measured, parameters (empowerment parameters) for evaluating an intellectual ability such as concentration ability, a memorization ability, a linguistic ability, and a communication ability of a person to be measured and a mental status such as a feeling or stress are calculated by performing signal processing on the biometric signal, and the parameters are used have been proposed. For example, a technique described in JP 2013-242763 A is known.

In JP 2013-242763 A, a conversation device that performs a conversation with a driver who drives a vehicle includes a storage unit, a degree of concentration measuring unit, and a conversation unit. The storage unit holds a preference database in which conversation candidates serving as candidates of conversation content with the driver are associated with conversation effects indicating a degree of improvement in a degree of driving concentration of the driver which is obtained by the conversation of the conversation candidate. The degree of concentration measuring unit measures the degree of driving concentration of the driver. If the degree of concentration measured by the degree of concentration measuring unit falls below a predetermined threshold value, the conversation unit selects a conversation candidate on the basis of the conversation effect in the preference database, performs a conversation based on the selected conversation candidate, calculates a conversation effect of the conversation on the basis of the degrees of concentration before and after the conversation is performed, and updates the conversation effect of the preference database.

SUMMARY OF THE INVENTION

The empowerment effects such as an improvement in the intellectual ability of the user, an improvement in the mental status, and the like are affected by parameters other than the empowerment parameters. For example, the empowerment effects are affected by a parameter (a continuity parameter) for evaluating a continuation desire such as an attentional state of the user, a conversation, and motivation for empowerment.

In the device disclosed in JP 2013-242763 A, conversation information is selected only on the basis of the empowerment parameters, and influence on the empowerment effect by a parameter having an attribute different from the empowerment effect of the continuity parameter or the like is not taken into consideration. Therefore, in the system of the related art, it is possible to present optimal conversation information only under a certain condition.

It is an object of the present invention to provide a technology capable of effectively implementing the improvement in the intellectual ability of the user and the improvement in the mental status in view of conversation parameters of a plurality of attributes such as the empowerment parameter and the continuity parameter, that is, a technique capable of performing the effective empowerment.

A representative example of the invention disclosed in the present application is as follows. That is, there is provided a system in which empowerment is performed by outputting conversation information to the user, the system including: a computer including a processor, a memory, and an interface; and a measuring device that measures signals of a plurality of types, wherein the processor calculates values of conversation parameters of a plurality of attributes for evaluating a state of a user who performs the empowerment on the basis of a plurality of signals measured by the measuring device, the processor selects a selection parameter which is a conversation parameter of a change target on the basis of the values of the conversation parameters of the plurality of attributes, the processor decides conversation information for changing a value of the selection parameter, and the processor outputs the decided conversation information to the user.

According to the present invention, it is possible to present the user with optimal conversation information on the basis of the conversation parameter for evaluating the state of the user. Therefore, it is possible to effectively implement the improvement in the intellectual ability of the user and the improvement in the mental status, that is, the effective empowerment. Problems, configurations, and effects which are not described above will be apparent from the following description of embodiments.

BRIEF DESCRIPTION OF THE DRAWINGS

FIG. 4 is a diagram illustrating an example of conversation history information according to the first embodiment;

FIG. 5 is a diagram illustrating an example of conversation parameter learning information according to the first embodiment;

FIG. 6 is a diagram illustrating an example of selection policy information of the first embodiment;

FIG. 7 is a diagram illustrating an example of conversation learning information according to the first embodiment;

FIG. 8 is a diagram illustrating an example of biometric signal information according to the first embodiment;

FIG. 9 is a diagram illustrating an example of biometric signal analysis information according to the first embodiment;

FIG. 10 is a diagram illustrating an example of language signal information according to the first embodiment;

FIG. 11 is a diagram illustrating an example of change amount analysis information of the first embodiment;

FIG. 12 is a diagram illustrating an example of parameter correlation analysis information according to the first embodiment;

FIG. 13 is a diagram illustrating an example of conversation/parameter correlation analysis information according to the first embodiment;

FIG. 20A is a diagram illustrating an example of conversation parameter learning information according to a second embodiment;

FIG. 20B is a diagram illustrating an example of conversation parameter learning information according to the second embodiment;

FIG. 21A is a diagram illustrating an example of biometric signal analysis information according to the second embodiment;

FIG. 21B is a diagram illustrating an example of biometric signal analysis information according to the second embodiment;

FIG. 25 is a diagram illustrating an example of a GUI for performing setting in a computer according to the fifth embodiment;

FIG. 26B is a diagram illustrating an example of a GUI displayed on the basis of output information or the like output by the computer according to the fifth embodiment.

DESCRIPTION OF THE PREFERRED EMBODIMENTS

Figure 1:
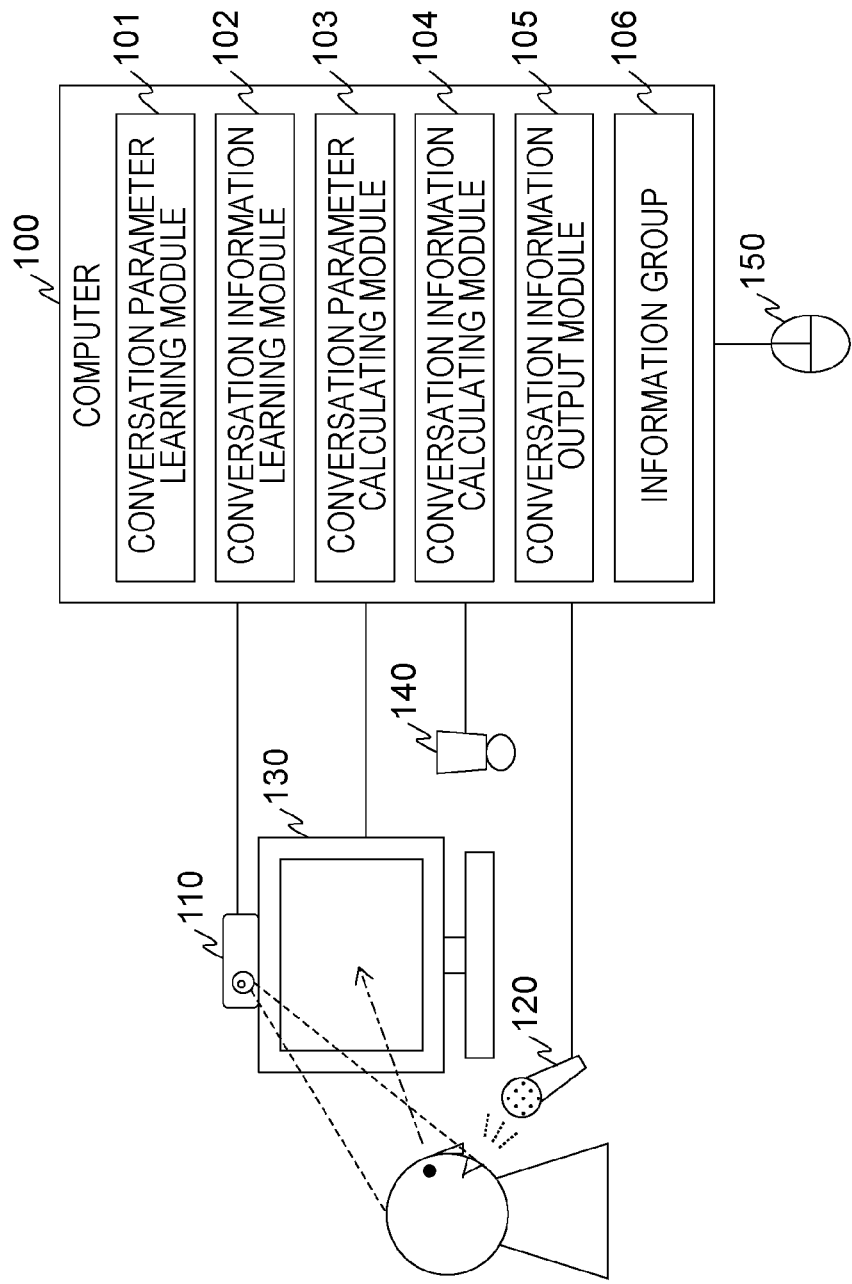
FIG. 1 is a diagram illustrating a configuration example of a system in which empowerment is performed according to a first embodiment.

An overview of the invention will be described. First, the terminology in this specification will be described.

The empowerment means that people or societies acquire a technique or an ability for solving problems or challenges on the basis of their own ability. In the present specification, a system for improving an intellectual ability such as a concentration ability, a memorization ability, a linguistic ability, a communication ability, power of idea, or the like through a conversation performed between the user and the system will be described as an example.

The system of the present invention includes a conversation information selection algorithm in which a selection criterion is different for each conversation parameter of a different attribute. The system acquires signals from the user and a system environment and calculates conversation parameters of a plurality of attributes for evaluating the state of the user. The system accurately detects the state of the user such as the mental status and a progress state of learning on the basis of the conversation parameters of a plurality of attributes and decides a conversation parameter of a change target. Further, the system selects conversation information for changing a value of the conversation parameter using the selection algorithm corresponding to the decided conversation parameter, and presents the selected conversation information to the user.

Since the system can present optimal conversation information in accordance with the state of the user through the above-described control, the intellectual ability and the like can be effectively improved.

Hereinafter, embodiments of the present invention will be described with reference to the accompanying drawings. In the drawings, the same reference numerals denote the same components.

First Embodiment

In a first embodiment, a system in which empowerment for improving a word memorization ability using conversation parameters of two attributes, that is, the empowerment parameter and the continuity parameter will be described. In the first embodiment, a parameter for evaluating the word memorization ability is used as the empowerment parameter.

Here, the empowerment parameter is a parameter for evaluating the empowerment effect. Specifically, the empowerment parameter is a parameter for evaluating the intellectual ability such as the concentration ability, the memorization ability, the linguistic ability, the communication ability, or the power of idea and the mental status such as a feeling and stress. The continuity parameter is a parameter for evaluating a continuation desire for a system use. Specifically, the continuity parameter is a parameter for evaluating factors related to motivation for an improvement in the intellectual ability, motivation for an improvement in the mental status, motivation for a system use, the attentional state of the user, and the like. In the present embodiment, a system in which the effective empowerment is performed using a plurality of conversation parameters which differ in a feature (index) to be evaluation, that is, an attribute.

In addition to the conversation parameters described above, conversation parameters such as external environment parameters such as a temperature and humidity may be considered.

In the first embodiment, the system using the conversation parameters of the two attributes will be described, but it is also applicable to systems using conversation parameters of three or more attributes. Further, a plurality of conversation parameters may be included in the same attribute.

FIG. 1 is a diagram illustrating a configuration example of a system in which the empowerment is performed according to the first embodiment.

The system is configured with a computer 100, a biometric signal measuring device 110, a language signal measuring device 120, a display device 130, and a conversation output device 140. An input device 150 such as a mouse, a keyboard, or a touch panel is connected to the computer 100.

The biometric signal measuring device 110 acquires biometric signals such as a face image signal, a voice signal, an electrocardiographic signal, a respiratory waveform signal, an electroencephalogram signal, and an optical topography signal from the user. In a case in which a plurality of types of biometric signals can be acquired, the biometric signal measuring device 110 acquires a biometric signal for each type. In the present embodiment, the face image signal is assumed to be acquired. As will be described later, the continuity parameter for evaluating the continuity for the system use is calculated using the biometric signal. In the present embodiment, the continuity parameter for evaluating the motivation for the improvement in the word memorization ability is calculated. In this specification, the motivation for the improvement in the word memorization ability is referred to simply as "motivation."

The language signal measuring device 120 acquires a language signal from the user. In the present embodiment, a voice is acquired as the language signal. As will be described later, the empowerment parameter for evaluating the empowerment effect is calculated using the language signal.

The computer 100 calculates the conversation parameters of a plurality of attributes on the basis of the biometric signal and the language signal, decides conversation information to be output on the basis of the conversation parameters of a plurality of attributes, and outputs the conversation information to the display device 130 or the conversation output device 140.

The display device 130 displays a screen on the basis of the conversation information. The conversation output device 140 outputs a voice on the basis of the conversation information.

The input device 150 is a device for inputting information (an external signal) of the computer 100.

Here, an overview of a configuration of the computer 100 will be described. The computer 100 includes a conversation parameter learning module 101, a conversation information learning module 102, a conversation parameter calculating module 103, a conversation information calculating module 104, and a conversation information output module 105, and holds an information group 106.

The conversation parameter learning module 101 and the conversation information learning module 102 generate the conversation information and information for selecting the conversation information through a learning process using the biometric signal and the language signal.

In order to calculate a value of a conversation parameter of an arbitrary attribute with a high degree of accuracy, the conversation parameter learning module 101 generates information indicating a relation between a measurement signal such as the biometric signal and the language signal and the conversation parameter of an arbitrary attribute. In the present embodiment, information indicating a relation between the biometric signal and the continuity parameter (motivation) and information indicating a relation between the language signal and the empowerment parameter (the word memorization ability) are generated.

The conversation information learning module 102 calculates the value of the conversation parameter of each attribute on the basis of the information or the like generated by the conversation parameter learning module 101. The conversation information learning module 102 generates a selection algorithm for selecting the conversation information on the basis of the calculated values of the conversation parameters of a plurality of attributes. Further, the conversation information learning module 102 generates the conversation information to be output on the basis of the conversation information which is previously output.

In the following description, the information indicating the relation between the measurement signal and the conversation parameter of an arbitrary attribute is also referred to as "relation information."

The conversation parameter calculating module 103 and the conversation information calculating module 104 detect the state of the user on the basis of the biometric signal, the language signal, and the information generated by the learning process and decide the conversation information to be presented in accordance with the state of the user.

The conversation parameter calculating module 103 calculates the values of the conversation parameters of a plurality of attributes on the basis of the biometric signal, the language signal, and the relation information. The conversation information calculating module 104 selects the selection algorithm on the basis of the calculated values of the conversation parameters of a plurality of attributes and decides the conversation information to be presented in accordance with the selection algorithm.

The conversation information output module 105 outputs the conversation information decided by the conversation information calculating module 104 to at least one of the display device 130 and the conversation output device 140.

In FIG. 1, one computer 100 includes the modules, but the modules may be arranged in a plurality of computers. In FIG. 1, the biometric signal measuring device 110 and the computer 100 are described as separate devices, but the computer 100 may include the biometric signal measuring device 110 or the like.

In the modules of the computer 100, two or more modules may be integrated into one module, or one module may be divided into a plurality of modules for each function.

Figure 2:
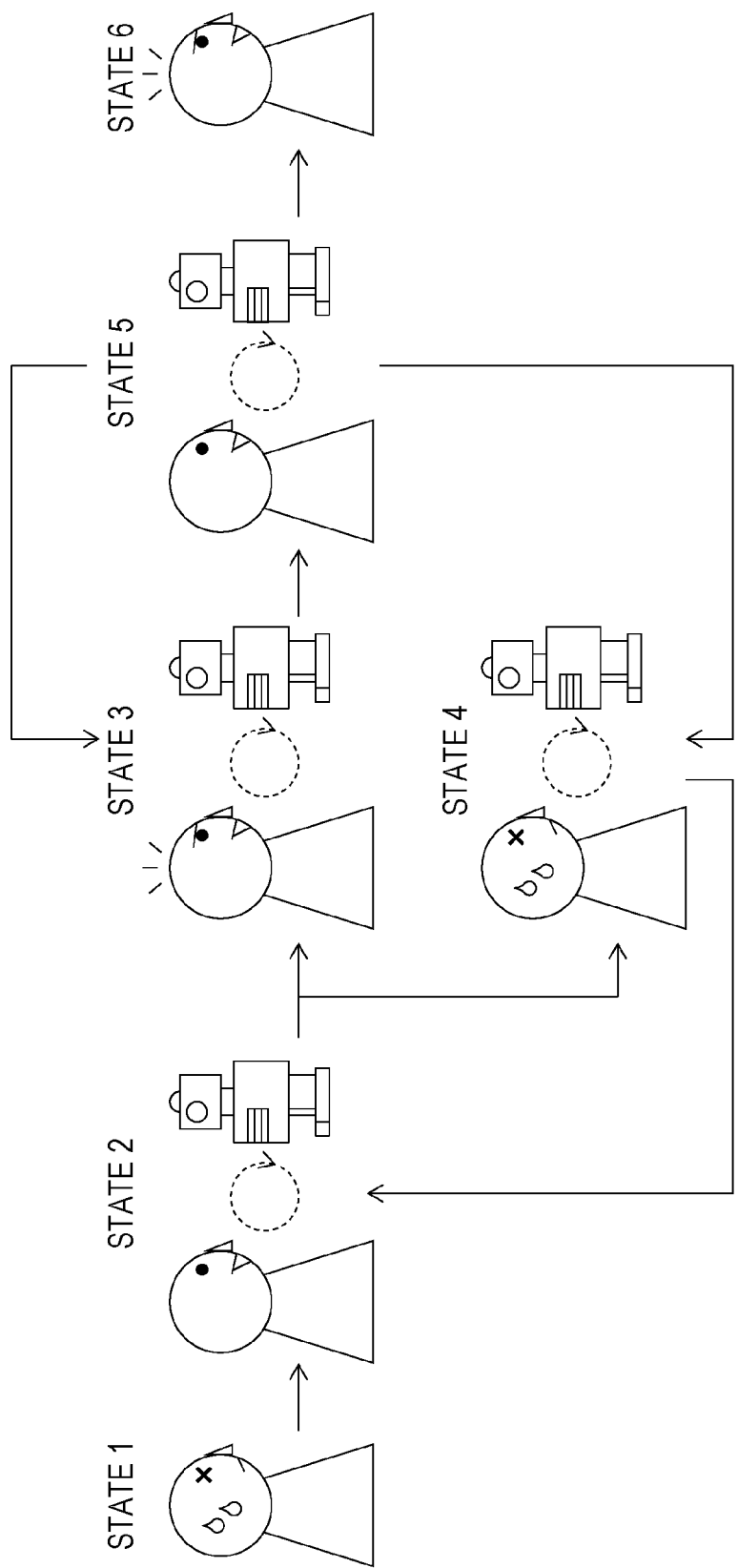
FIG. 2 is a diagram illustrating an example of a flow of an operation when empowerment is performed using the system according to the first embodiment.

FIG. 2 is a diagram for describing an example of the flow of the operation when the empowerment is performed using the system of the first embodiment.

First, a state 1 indicates a state before the empowerment is performed. In the state 1, information such as an empowerment parameter item and a continuity parameter item, and a target value of the empowerment parameter is set in the system.

A state 2 indicates a state in which the biometric signal and the language signal are input. In the state 2, the system calculates the empowerment parameter and the continuity parameter from the acquired biometric signal and the language signal.

In a case in which the continuity parameter is a threshold value or less, the system transitions to a state 4 and presents the conversation information for enhancing the motivation to the user. Thereafter, the system transitions to the state 2 and calculates the empowerment parameter and the continuity parameter from the newly acquired biometric signal and the language signal. In a case in which the continuity parameter is higher than the threshold value, the system transitions to a state 3, presents the conversation information for improving the word memorization ability to the user, and performs the empowerment. Further, the system transitions to a state 5.

In the state 5, the system calculates the empowerment parameter and the continuity parameter from the biometric signal and the language signal acquired after the conversation information is output, and determines whether or not the empowerment parameter reaches the target value. When the empowerment parameter reaches the target value, the system transitions to a state 6 and ends execution of the empowerment.

When the empowerment parameter does not reach the target value, and the continuity parameter is a threshold value or more, the system transitions to the state 3. When the empowerment parameter does not reach the target value, and the continuity parameter is a threshold value or less, the system transitions to a state 4.

As described above, the system of the present embodiment decides whether or not the execution of the empowerment can be continued on the basis of conversation parameters of a plurality of attributes. When the execution of the empowerment can be continued, the system presents the conversation information for improving the empowerment and continues the empowerment. On the other hand, when the execution of empowerment is unable to be continued, the system presents the conversation information for improving the motivation.

In the system of the related art, the effective empowerment is not necessarily performed because only the conversation information for improving the empowerment parameter is presented to the user. On the other hand, in the present embodiment, the computer 100 presents the conversation information for improving the state of the user on the basis of the value of the conversation parameter of each attribute. Therefore, the effective empowerment can be performed.

Figure 3:
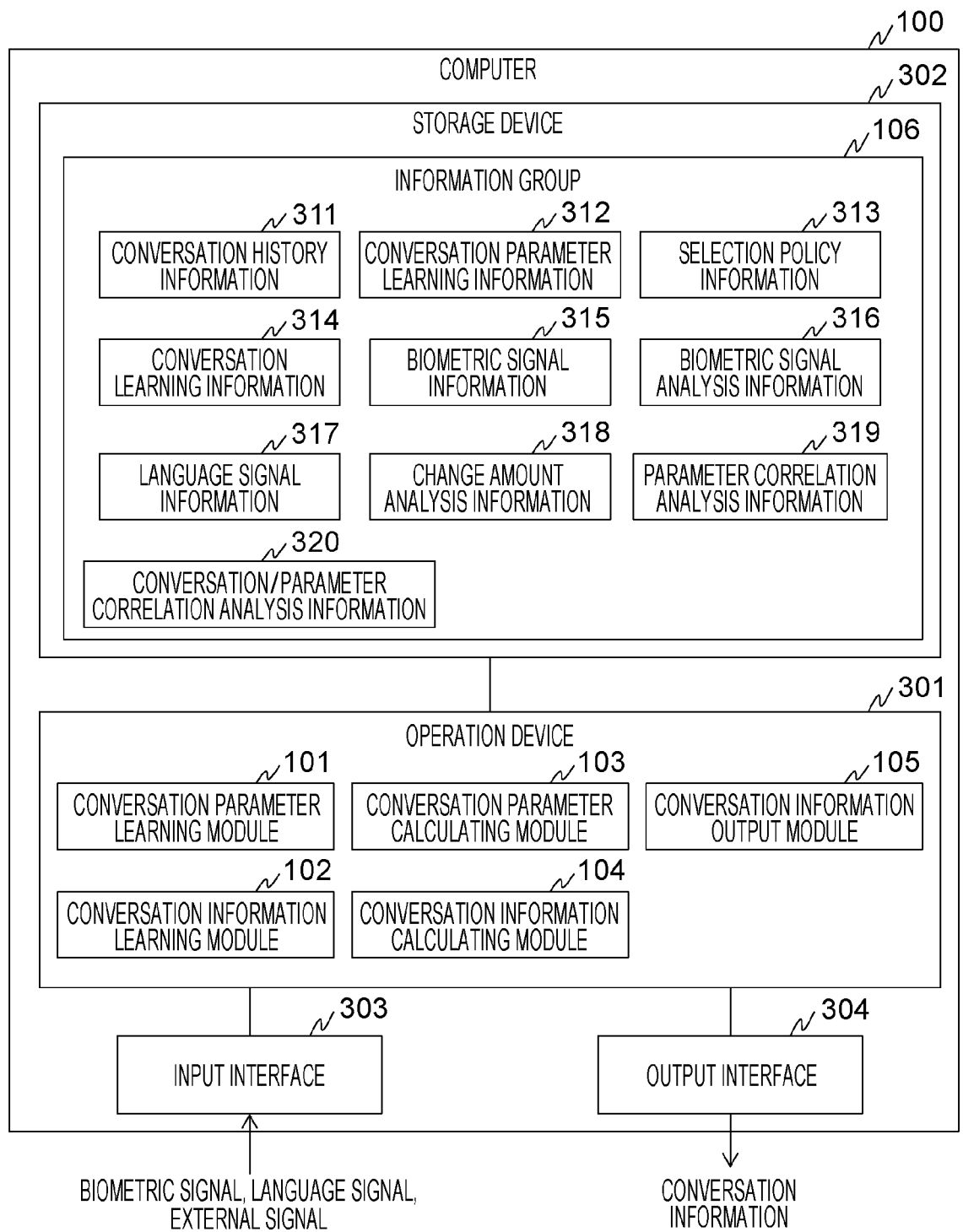
FIG. 3 is a diagram illustrating an example of a detailed configuration of a computer according to the first embodiment.

FIG. 3 is a diagram illustrating an example of a detailed configuration of the computer 100 of the first embodiment.

As illustrated in FIG. 3, the computer 100 includes an operation device 301, a storage device 302, an input interface 303, and an output interface 304.

The operation device 301 is hardware such as a central processing unit (CPU) and a graphics processing unit (GPU) and executes a program stored in the storage device 302. The operation device 301 operates in accordance with a program and functions as a predetermined module. In the present embodiment, the operation device 301 operates as the conversation parameter learning module 101, the conversation information learning module 102, the conversation parameter calculating module 103, the conversation information calculating module 104, and the conversation information output module 105.

The storage device 302 is hardware such as a memory and stores a program executed by the operation device 301 and information used by the program. Further, the storage device 302 includes a work area used by program. The program and the information stored in the storage device 302 will be described later.

The input interface 303 is hardware for receiving inputs such as the biometric signal, the language signal, the external signal, and the like. In a case in which it is connected to a device that inputs a signal via a connection line of a Universal Serial Bus (USB) standard, a USB terminal functions as the input interface 303, and in a case in which it is connected to a device that inputs a signal via a network, a network interface functions as the input interface 303.

The output interface 304 is hardware for outputting the conversation information and the like. In a case in which a device that outputs the conversation information is a display, a VGA terminal or a HDMI terminal functions as the output interface 304, and in a case in which the device that outputs the conversation information is a speaker, a USB terminal functions as the output interface 304.

Here, the program and information stored in the storage device 302 will be described.

The storage device 302 stores the program for implementing the conversation parameter learning module 101, the conversation information learning module 102, the conversation parameter calculating module 103, the conversation information calculating module 104, and the conversation information output module 105. Further, the storage device 302 holds conversation history information 311, conversation parameter learning information 312, selection policy information 313, conversation learning information 314, biometric signal information 315, biometric signal analysis information 316, language signal information 317, change amount analysis information 318, parameter correlation analysis information 319, and conversation/parameter correlation analysis information 320.

The conversation history information 311 is information for managing the conversation information which has been previously output. The conversation history information 311 will be described in detail with reference to FIG. 4.

The conversation parameter learning information 312 is information for managing a learning result of the conversation parameter which is required to be learned. The conversation parameter of a predetermined attribute is calculated on the basis of the conversation parameter learning information 312. In the present embodiment, the continuity parameter is the conversation parameter which is required to be learned. The conversation parameter learning information 312 will be described in detail with reference to FIG. 5.

The selection policy information 313 is information for managing a selection policy of the conversation information to be output. The selection policy information 313 will be described in detail with reference to FIG. 6.

The conversation learning information 314 is information which is referred to when the computer 100 decides the conversation information to be output. The conversation learning information 314 will be described in detail with reference to FIG. 7.

The biometric signal information 315 is information for managing the biometric signal and is temporarily generated information. The biometric signal information 315 will be described in detail with reference to FIG. 8.

The biometric signal analysis information 316 is information for managing a relation between the conversation parameter which is required to be learned and the biometric signal and is temporarily generated information. The biometric signal analysis information 316 will be described in detail with reference to FIG. 9.

The language signal information 317 is information for managing the language signal and is temporarily generated information. The language signal information 317 will be described in detail with reference to FIG. 10.

The change amount analysis information 318 and the parameter correlation analysis information 319 are information which is temporarily generated when the selection policy information 313 is generated or updated. The change amount analysis information 318 will be described in detail with reference to FIG. 11, and the parameter correlation analysis information 319 will be described in detail with reference to FIG. 12.

The conversation/parameter correlation analysis information 320 is information which is temporarily generated when the conversation learning information 314 is generated or updated. The conversation/parameter correlation analysis information 320 will be described in detail with reference to FIG. 13.

The information held in the computer 100 will be described in detail with reference to FIGS. 4 to 13.

FIG. 4 is a diagram illustrating an example of the conversation history information 311 of the first embodiment.

The conversation history information 311 includes an entry configured with the output conversation information, the conversation parameter used when the conversation information is decided, the value of conversation parameter of each attribute before and after the conversation information is output. One entry corresponds to one pieces of conversation information.

The entry included in the conversation history information 311 of the present embodiment include an ID 401, output conversation information 402, a selection parameter 403, an empowerment parameter name 404, a pre-conversation empowerment parameter 405, a post-conversation empowerment parameter 406, a continuity parameter name 407, a pre-conversation continuity parameter 408, and a post-conversation continuity parameter 409.

The ID 401 is a field for storing an identification number uniquely identifying the entry included in the conversation history information 311.

The output conversation information 402 is a field for storing the output conversation information.

The selection parameter 403 is a field for storing an attribute and a type of the conversation parameter used when the conversation information is decided. The name of the conversation parameter or the like is stored in the selection parameter 403. In the present embodiment, the conversation information for changing the value of the conversation parameter of the attribute set in the selection parameter 403 is output. In the following description, the conversation parameter set in the selection parameter 403 is also referred to as a "selection parameter."

The empowerment parameter name 404, the pre-conversation empowerment parameter 405, the post-conversation empowerment parameter 406, the continuity parameter name 407, the pre-conversation continuity parameter 408, and the post-conversation continuity parameter 409 are a field group for managing the values of the conversation parameters of each attribute before and after the conversation information is output.

In a case in which there are a plurality of conversation parameters having the same attribute, fields for storing the values of the conversation parameters before and after the conversation information is output are included in one entry by the number of conversation parameters having the same attribute. For example, in a case in which there are two continuity parameters, two sets each including the continuity parameter name 407, the pre-conversation continuity parameter 408, and the post-conversation continuity parameter 409 are included in one entry. More specifically, a set of a "continuity parameter name 1," a "pre-conversation continuity parameter 1," and a "post-conversation continuation parameter 1" and a set of a "continuity parameter name 2," a "pre-conversation continuity parameter 2," and a "post-conversation continuity parameter 2" are included in one entry.

FIG. 5 is a diagram illustrating an example of the conversation parameter learning information 312 of the first embodiment.

The conversation parameter learning information 312 includes an entry configured with an attribute of the conversation parameter which is required to be learned and a coefficient used for calculating the conversation parameter. One entry corresponds to one conversation parameter.

For the conversation parameter which is required to be learned, a relational expression obtained by using a fitting method or the like is given. For example, a relational expression such as a linear function $y=ax$ or a quadratic function $y=ax^2+bx+c$ may be considered. Here, "x" is a variable corresponding to a feature quantity for calculating the conversation parameter, and "y" is a variable corresponding to the conversation parameter. For the linear function, a value of a coefficient "a" is stored in the entry, and in case of the quadratic function, the values of coefficient "a," "b," and "c" are stored in the entry. The computer 100 calculates the coefficient(s) of the relational expression by executing a learning process to be described later. The coefficient(s) of the relational expression is calculated using the least square technique or the like.

The entry may include a field for storing the relational expression.

The entry included in the conversation parameter learning information 312 of the present embodiment is configured with an ID 501, a continuity parameter name 502, and a continuity parameter coefficient 503.

The ID 501 is a field for storing an identification number uniquely identifying the entry included in the conversation parameter learning information 312.

The continuity parameter name 502 is a field for storing the name of the continuity parameter indicating the attribute of the conversation parameter which is required to be learned.

The continuity parameter coefficient 503 is a field for storing the coefficient of the relational expression for calculating the continuity parameter.

FIG. 6 is a diagram illustrating an example of the selection policy information 313 of the first embodiment.

The selection policy information 313 includes an entry configured with a threshold value of the conversation parameter of each attribute serving as a reference when the conversation information is decided.

The entry containing the selection policy information 313 of the present embodiment is configured with an empowerment parameter name 601, an empowerment threshold value 602, a continuity parameter name 603, and a continuity threshold value 604.

The empowerment parameter name 601 and the continuity parameter name 603 are fields for storing the name of the conversation parameter indicating the attribute of the conversation parameter.

The empowerment threshold value 602 and the continuity threshold value 604 are fields for storing the threshold value to be used when the conversation parameter is decided as the selection parameter.

In a case in which there are a plurality of conversation parameters having the same attribute, sets of fields for storing the type of the conversation parameter and the threshold value are included in one entry by the number of conversation parameters having the same attribute. For example, in a case in which there are two empowerment parameters, two sets of the empowerment parameter name 601 and the empowerment threshold value 602 are included in one entry. More specifically, a set of an "empowerment parameter 1" and an "empowerment threshold value 1" and a set of an "empowerment parameter 2" and an "empowerment threshold value 2" are included in one entry.

FIG. 7 is a diagram illustrating an example of the conversation learning information 314 of the first embodiment.

The conversation learning information 314 includes an entry configured with the value of the conversation parameter of each attribute, the conversation information to be output, and a selection algorithm for the conversation information. The conversation learning information 314 includes entries which are equal to the number of combinations of the values of the conversation parameter of each attribute.

The entry included in the conversation learning information 314 of the present embodiment is configured with an ID 701, an empowerment parameter name 702, an empowerment parameter 703, a continuity parameter name 704, a continuity parameter 705, conversation information 706, a selection parameter 707, and a probability 708.

The ID 701 is identification information uniquely identifying the entry of the conversation learning information 314.

The empowerment parameter name 702 and the continuity parameter name 704 are fields for storing a name indicating the attribute of the conversation parameter.

The empowerment parameter 703 and the continuity parameter 705 are fields for storing the value of the conversation parameter. The empowerment parameter 703 is the value of the empowerment parameter corresponding to the empowerment parameter name 702, and the continuity parameter 705 is the value of the continuity parameter corresponding to the continuity parameter name 704.

The conversation information 706 is a field for storing the conversation information to be output.

The selection parameter 707 and the probability 708 are fields for storing information corresponding to the selection algorithm for deciding the conversation information. The selection parameter 707 is a field for storing the selection parameter used when the conversation information is output. The probability 708 is a field for storing a probability that the conversation information corresponding to the conversation information 706 will be selected when the conversation information is decided with reference to the selection parameter corresponding to the selection parameter 707.

A set of rows having the same selection parameter 707 corresponds to the selection algorithm.

FIG. 8 is a diagram illustrating an example of the biometric signal information 315 of the first embodiment.

The biometric signal information 315 includes an entry configured with a type of the biometric signal, a time at which the biometric signal is acquired, and a measured value of the biometric signal. One entry corresponds to one biometric signal.

The entry included in the biometric signal information 315 of the present embodiment is configured with an ID 801, a signal name 802, a time 803, and a signal 804.

The ID 801 is a field for storing an identification number uniquely identifying the entry of the biometric signal information 315.

The signal name 802 is a field for storing a name of the biometric signal indicating the type of the biometric signal. The name of the biometric signal may be set in advance for each type of biometric signal acquired by the biometric signal measuring device 110 or may be included in the biometric signal.

The time 803 is a field for storing a time at which the biometric signal is acquired. For example, a time based on a start time of measurement of the biometric signal is stored in the time 803.

The signal 804 is a field for storing the measured value. In a case in which an image is measured as the biometric signal, image data may be stored in the signal 804, or a numerical value indicating a converted RGB value may be stored in the signal 804.

Since the biometric signal information 315 is generated in each of the learning process and the conversation information output process, management is performed so that biometric signal information 315 used in each process can be identified. For example, a method of assigning identification information of a module which has generated the biometric signal information 315, a method of changing a name such as first biometric signal information and second biometric signal information, and the like are considered.

FIG. 9 is a diagram illustrating an example of the biometric signal analysis information 316 of the first embodiment.

The biometric signal analysis information 316 includes an entry configured with identification information of a problem performed to calculate the conversation parameter which is required to be learned, a feature quantity used to calculate the value of the conversation parameter which is required to be learned, and the value of the conversation parameter which is required to be learned. Entries which are equal to a number obtained by multiplying the number of conversation parameters which are required to be learned by the number of biometric signals acquired in one problem are included in the biometric signal analysis information 316.

The entry included in the biometric signal analysis information 316 of the present embodiment is configured with a reference ID 901, a problem ID 902, a continuity parameter name 903, a continuity parameter 904, and a feature quantity 905.

The reference ID 901 is a field corresponding to the ID 801. The computer 100 is able to detect a biometric signal from which the conversation parameter is calculated on the basis of the reference ID 901.

The problem ID 902 is a field for storing the identification information of the problem performed to calculate the conversation parameter which is required to be learned.

The continuity parameter name 903 is a field for storing the name of the conversation parameter indicating the attribute of the conversation parameter which is required to be learned.

The continuity parameter 904 is a field for storing the value of the conversation parameter which is required to be learned.

The feature quantity 905 is a field for storing the feature quantity used for calculating the conversation parameter which is required to be learned. The feature quantity is a value calculated using the biometric signal. A method of calculating the feature quantity is set in advance.

In a case in which there are a plurality of feature quantities used for calculating one conversation parameter, a field storing a plurality of feature quantities is included in one entry.

FIG. 10 is a diagram illustrating an example of the language signal information 317 of the first embodiment.

The language signal information 317 includes an entry configured with a type of the language signal, a time at which the language signal is acquired, and a measured value of the language signal. One entry corresponds to one language signal.

The entry included in the language signal information 317 of the present embodiment is configured with an ID 1001, a signal name 1002, a time 1003, and a signal 1004.

The ID 1001 is a field for storing an identification number uniquely identifying entry of language signal information 317.

The signal name 1002 is a field for storing the name of the language signal indicating the type of the language signal. The name of the language signal may be set in advance for each language signal type acquired by the language signal measuring device 120 and may be included in the language signal.

The time 1003 is a field for storing a time at which the language signal is acquired. For example, a time based on a start time of measurement of the biometric signal is stored in the time 1003. Information indicating a relation of a measurement start time of the language signal and a measurement start time of the biometric signal, and a measurement start time of the language signal may be stored in the time 1003.

The signal 1004 is a field for storing the measured value. A value obtained by performing A/D conversion the voice signal acquired by the language signal measuring device 120 is stored in the signal 1004.

FIG. 11 is a diagram illustrating an example of the change amount analysis information 318 of the first embodiment.

The change amount analysis information 318 includes an entry configured with a change amount of the conversation parameter of each attribute according to the presentation of the conversation information and information used for deciding the threshold value of the conversation parameter of each attribute. One entry corresponds to one entry of the conversation history information 311.

The entry included in the change amount analysis information 318 of the present embodiment is configured with a reference ID 1101, an empowerment parameter change amount 1102, a continuity parameter change amount 1103, an in-conversation continuity parameter 1104, an empowerment determination result 1105, and a continuity determination result 1106.

The reference ID 1101 is a field corresponding to the ID 401. The computer 100 is able to detect an entry of the conversation history information 311 corresponding to an analysis result on the basis of the reference ID 1101.

The empowerment parameter change amount 1102, the continuity parameter change amount 1103, and the in-conversation continuity parameter 1104 are fields for storing the change amount of the conversation parameter of each attribute according to the presentation of the conversation information.

A difference between the post-conversation empowerment parameter 406 and the pre-conversation empowerment parameter 405 is stored in the empowerment parameter change amount 1102. A difference between post-conversation continuity parameter 409 and the pre-conversation continuity parameter 408 is stored in the continuity parameter change amount 1103. A value calculated on the basis of a relational expression using at least one of the pre-conversation continuity parameter 408 and the post-conversation continuity parameter 409 is stored in the in-conversation continuity parameter 1104. The relational expression is assumed to be given in advance. For example, the same value as the pre-conversation continuity parameter 408 or the post-conversation continuity parameter 409 may be set in the in-conversation continuity parameter 1104, or a value calculated by weighted averaging using the pre-conversation continuity parameter 408 and the post-conversation continuity parameter 409 may be set in the in-conversation continuity parameter 1104.

The empowerment determination results 1105 and the continuity determination result 1106 are fields for storing information used for deciding the threshold value of the conversation parameter of each attribute.

A result of a determination process based on the change amount of the empowerment parameter is stored in the empowerment determination result 1105. A determination result based on the change amount of the continuity parameter is stored in the continuity determination result 1106. In a case in which a determination condition is satisfied, a value such as "OK" or "1" is stored in the empowerment determination result 1105 and the continuity determination result 1106, and in a case in which the determination condition is not satisfied, a value such as "NG" or "0" is stored in the empowerment determination result 1105 and the continuity determination result 1106. In the present embodiment, as will be described later, a process of determining whether or not each change amount is included in a predetermined range is executed, and a result of the process is stored in the empowerment determination result 1105 and the continuity determination result 1106.

FIG. 12 is a diagram illustrating an example of the parameter correlation analysis information 319 of the first embodiment.

The parameter correlation analysis information 319 includes an entry configured with the selection parameter used when the conversation information is decided and the attribute and the analysis result of the conversation parameter serving as a correlation analysis target. Entries which are equal to the number of combinations of conversation parameters whose correlation is to be analyzed are included in the parameter correlation analysis information 319.

The entry included in the parameter correlation analysis information 319 of the present embodiment is configured with an ID 1201, a selection parameter name 1202, an empowerment parameter name 1203, an empowerment parameter coefficient 1204, a continuity parameter name 1205, and a continuity parameter coefficient 1206. In the present embodiment, since each of the number of empowerment parameters and the number of continuity parameters is one, one entry is included in the parameter correlation analysis information 319.

The ID 1201 is a field for storing identification information uniquely identifying the entry of the parameter correlation analysis information 319.

The selection parameter name 1202 is a field for storing the name of the conversation parameter indicating the type of the selection parameter used when the conversation information is decided.

The empowerment parameter name 1203 and the continuity parameter name 1205 are fields for storing a name indicating the attribute of the conversation parameter serving as the correlation analysis target. The empowerment parameter coefficient 1204 and the continuity parameter coefficient 1206 are fields for storing the analysis result.

A coefficient of a relational expression for calculating the change amount of the empowerment parameter is stored in the empowerment parameter coefficient 1204. A coefficient of the relational expression for calculating the change amount of the continuity parameter is stored in the continuity parameter coefficient 1206.

The relational expression for calculating the change amount of the conversation parameter of each attribute can be obtained using a fitting method or the like. For example, a relational expression such as a linear function $y=ax$ or a quadratic function $y=ax^2+bx+c$ may be considered. In the case of the empowerment parameter, "x" is a variable corresponding to the in-conversation continuity parameter, and "y" is a variable corresponding to the change amount of the empowerment parameter. In the case of the continuity parameter, "x" is a variable corresponding to the pre-conversation continuity parameter, and "y" is a variable corresponding to the change amount of the continuity parameter. The coefficient of the relational expression is calculated using the least square technique or the like.

In the present embodiment, a combination of conversation parameter serving as the correlation analysis target is self-evident. In a case in which there are a plurality of combinations of conversation parameters, the combination of conversation parameters serving as the correlation analysis target and the relational expressions are set in advance.

FIG. 13 is a diagram illustrating an example of the conversation/parameter correlation analysis information 320 of the first embodiment.

The conversation/parameter correlation analysis information 320 includes an entry configured with a type of the selection parameter used when the conversation information is decided, the value of the conversation parameter before the conversation information of each attribute is output, and the conversation information of each change trend of the conversation parameter of each attribute. The conversation information for each change trend of the conversation parameter of each attribute is information obtained from a correlation between the change amount of the conversation parameter and the conversation information. Entries which are equal to the number of combinations of the selection parameter used when the conversation information is decided and the value of the conversation parameter of each attribute are included in the conversation/parameter correlation analysis information 320.

The entry included in the conversation/parameter correlation analysis information 320 of the present embodiment are configured with an ID 1301, a selection parameter name 1302, an empowerment parameter name 1303, a pre-conversation empowerment parameter 1304, a continuity parameter name 1305, a pre-conversation continuity parameter 1306, an empowerment enhancement conversation 1307, an empowerment weakening conversation 1308, a continuity enhancement conversation 1309, and a continuity weakening conversation 1310.

The ID 1301 is a field for storing identification information uniquely identifying the entry of the conversation/parameter correlation analysis information 320.

The selection parameter name 1302 is a field for storing a name indicating the attribute of the conversation parameter corresponding to the selection parameter.

The empowerment parameter name 1303 and the continuity parameter name 1305 are fields for storing a name indicating the attribute of the conversation parameter.

The pre-conversation empowerment parameter 1304 and the pre-conversation continuity parameter 1306 are fields for storing the value of the conversation parameter of each attribute before the conversation information is output.

The empowerment enhancement conversation 1307, the empowerment weakening conversation 1308, the continuity enhancement conversation 1309, and the continuity weakening conversation 1310 are fields for storing the conversation information for each change trend of the conversation parameter of each attribute. The conversation information for increasing the value of empowerment parameter is stored in the empowerment enhancement conversation 1307. The conversation information for decreasing the value of empowerment parameter is stored in the empowerment weakening conversation 1308. The conversation information for increasing the value of the continuity parameter is stored in the continuity enhancement conversation 1309. The conversation information for decreasing the value of the continuity parameter is stored in the continuity weakening conversation 1310.

Next, a process executed by the computer 100 will be described in detail. First, the process in the learning process will be described with reference to FIGS. 14 and 15.

Figure 14:
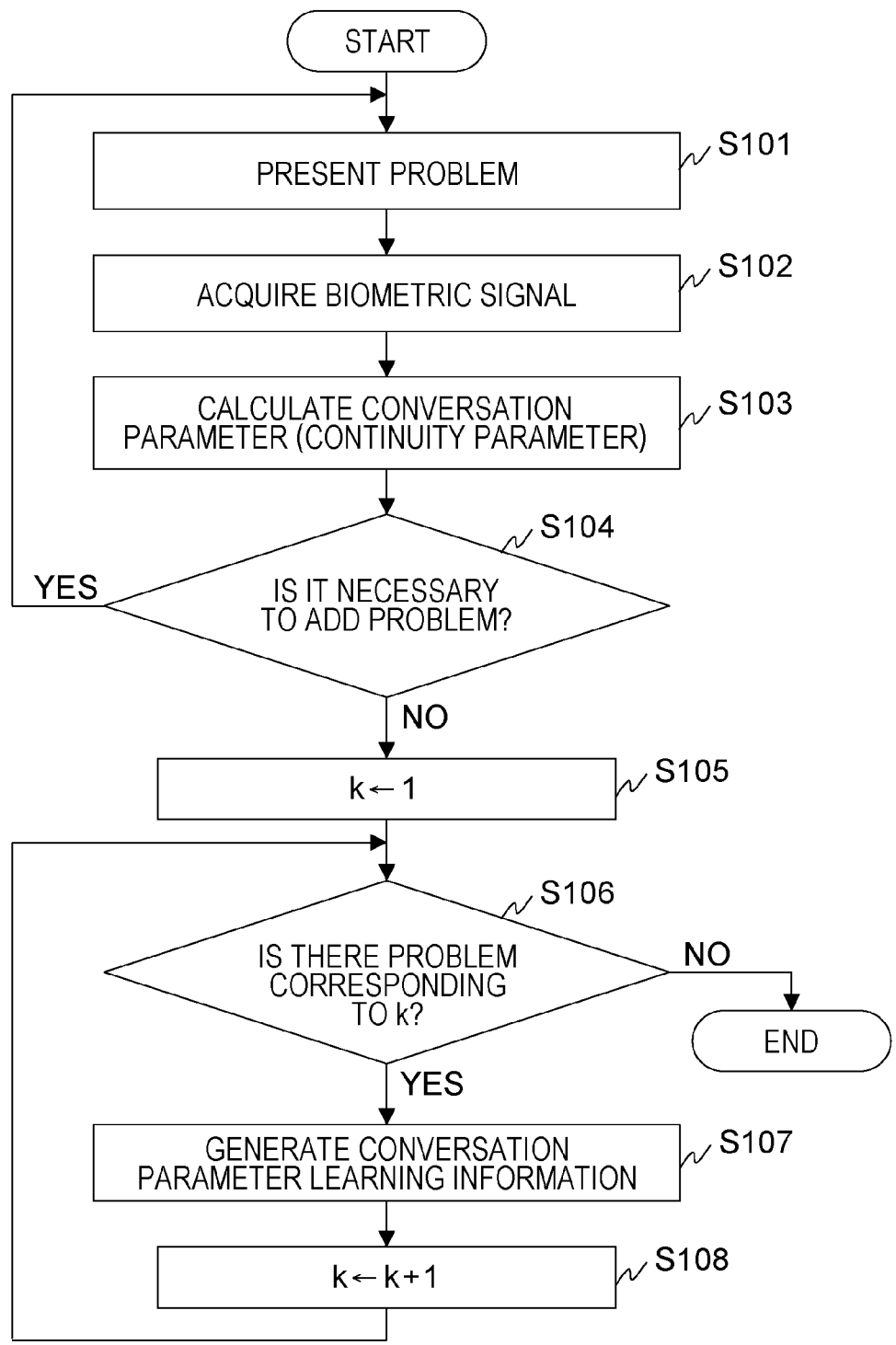
FIG. 14 is a flowchart illustrating an example of a process executed by a conversation parameter learning module according to the first embodiment.

FIG. 14 is a flowchart for describing an example of a process executed by the conversation parameter learning module 101 of the first embodiment. The conversation parameter learning module 101 executes a process to be described below at an arbitrary timing.

The conversation parameter learning module 101 presents a problem used for learning to the user (step S101). At this time, the conversation parameter learning module 101 outputs an instruction related to a behavior to be performed by the user for the presented problem in order to acquire information necessary for calculating the conversation parameter of an arbitrary attribute. The user behaves for the problem in accordance with the output instruction. An identification number is assigned to each problem in order starting from "1."

In a case in which the conversation parameter which is required to be learned is the continuity parameter, a reward problem is presented to the user. In this case, a response to the reward problem for changing the motivation is performed as a behavior.

The instruction for the presented problem may be input by an administrator or may be realized by adding a function of presenting a problem to the conversation parameter learning module 101 or the conversation information output module 105.

Then, the conversation parameter learning module 101 acquires the biometric signal through the input interface 303 (step S102), and calculates the conversation parameter (step S103). Specifically, the following process is executed.

In a case in which the biometric signal is acquired, the conversation parameter learning module 101 generates empty biometric signal information 315 and empty biometric signal analysis information 316. The conversation parameter learning module 101 adds entries which are equal to the number of acquired biometric signals to the biometric signal information 315 and sets a value for each biometric signal in each entry.

The conversation parameter learning module 101 adds entries which are equal to a number calculated by multiplying the number of entries added to the biometric signal information 315 by the number of conversation parameters which are required to be learned to the biometric signal analysis information 316, and sets the identification number of the presented problem in each entry. The conversation parameter learning module 101 sets the identification number of the biometric signal and the type of the conversation parameter which is required to be learned in each entry.

The conversation parameter learning module 101 calculates the value of the conversation parameter on the basis of a load of the problem or a behavior result for the problem and sets the calculated value in the entry added to the biometric signal analysis information 316 corresponding to the conversation parameter. In the present embodiment, a numerical value between "0" and "100" indicating the degree of motivation is calculated as the value of continuity parameter.

The conversation parameter learning module 101 selects a target entry from among the entries added to the biometric signal information 315 and calculates the feature quantity using the measured value, the time, and the like set in the target entry. A method of calculating the feature quantity is set in advance.

For example, when a face image is acquired as the biometric signal, the feature quantity is calculated using the method described in M Z Poh et al., "Advancements in noncontact, multiparameter physiological measurements using a webcam," IEEE Transactions on Biomedical Engineering, vol. 58, no. 1, pp. 7-11 (2011). Specifically, the computer 100 extracts some regions of a face, acquires a time at which a RGB value of the region becomes maximum and a time at which the RGB value of the region becomes minimum from the biometric signal information 315, and calculates a pulse wave interval as the feature quantity using the times. Alternatively, a method of calculating a pulse rate calculated using an electrocardiogram and a pulse wave signal as the feature quantity may be used.

The conversation parameter learning module 101 sets the calculated feature quantity in the entry whose reference ID 901 coincides with the ID 801 of the target entry. The conversation parameter learning module 101 executes the above-described process on all the entries added to the biometric signal information 315.

In a case in which the feature quantity which is previously calculated can be reused, the feature quantity may be used. In a case in which the feature quantity is calculated, signal processing for reducing noise such as a band pass filter or trend division may be executed.

The conversation parameter which is required to be learned may be decided by the administrator or may be decided on the basis of the definition information stored in the storage device 302. The above description is description of the process of step S102 and step S103.

Then, the conversation parameter learning module 101 determines whether or not it is necessary to add a problem (step S104).

For example, when all the preset problems end, if the number of times of executions of the problem is a threshold value or more or if the type of the executed problem is a threshold value or more, the conversation parameter learning module 101 determines that it is not necessary to add a problem. Further, the administrator may decide whether or not it is necessary to add a problem.

When it is determined that it is necessary to add a problem, the conversation parameter learning module 101 returns to step S101 and executes a similar process.

When it is determined that it is not necessary to add a problem, the conversation parameter learning module 101 sets an initial value "1" to a variable k indicating the identification number of the problem (step S105).

Then, the conversation parameter learning module 101 determines whether or not there is a problem whose identification number is the variable k (step S106).

When it is determined that there is a problem whose identification number is the variable k, the conversation parameter learning module 101 generates the conversation parameter learning information 312 (step S107). Specifically, the conversation parameter learning information 312 is generated in accordance with the following procedure.

(Procedure 1)

The conversation parameter learning module 101 generates the empty conversation parameter learning information 312 and adds entries which are equal to the number of conversation parameters which are required to be learned. The conversation parameter learning module 101 sets the name indicating the attribute of the conversation parameter in each added entry.

In the present embodiment, the conversation parameter learning module 101 adds one entry to the conversation parameter learning information 312 and sets "1" in the ID 501 of the added entry. The conversation parameter learning module 101 sets the name of the continuity parameter in the continuity parameter name 502.

(Procedure 2)

The conversation parameter learning module 101 selects the target entry from the conversation parameter learning information 312. The conversation parameter learning module 101 specifies the entry corresponding to the problem whose identification number is the variable k with reference to the biometric signal analysis information 316.

In the present embodiment, the conversation parameter learning module 101 identifies an entry whose problem ID 902 coincides with the variable k.

(Procedure 3)

The conversation parameter learning module 101 executes a statistical process using the value of the conversation parameter and the feature quantity set in the specified entry and calculates the coefficient indicating the correlation between the value of the conversation parameter and the feature quantity. The conversation parameter learning module 101 sets the calculated coefficient in the target entry.

In the present embodiment, the conversation parameter learning module 101 calculates the continuity parameter coefficient 503 from the continuity parameter 904 and the feature quantity 905 of each entry specified in (procedure 2). The conversation parameter learning module 101 sets the calculated coefficient in the continuity parameter coefficient 503 of the entry added in (procedure 1).

The conversation parameter learning module 101 executes the process of (procedure 2) and (procedure 3) on all the entries of the conversation parameter learning information 312. The above description is description of the process of step S107.

Then, the conversation parameter learning module 101 updates the variable k by adding 1 to the variable k (step S108), and then returns to step S106.

When it is determined in step S106 that there is no problem whose identification number is the variable k, the conversation parameter learning module 101 ends the process.

It is possible to calculate the precision conversation parameter value through the learning process illustrated in FIG. 14.

Figure 15:
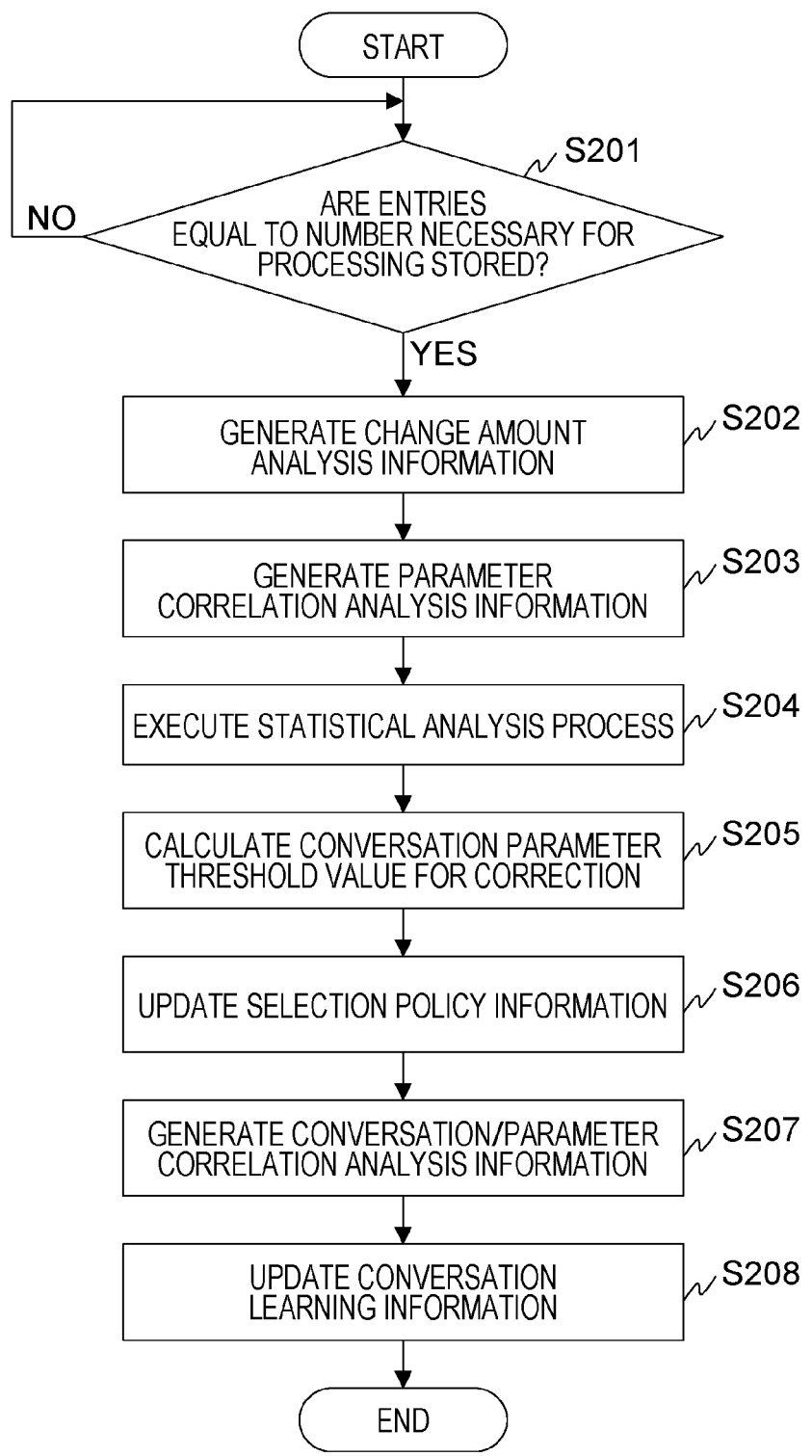
FIG. 15 is a flowchart illustrating an example of a process executed by a conversation information learning module according to the first embodiment.
Figure 16:
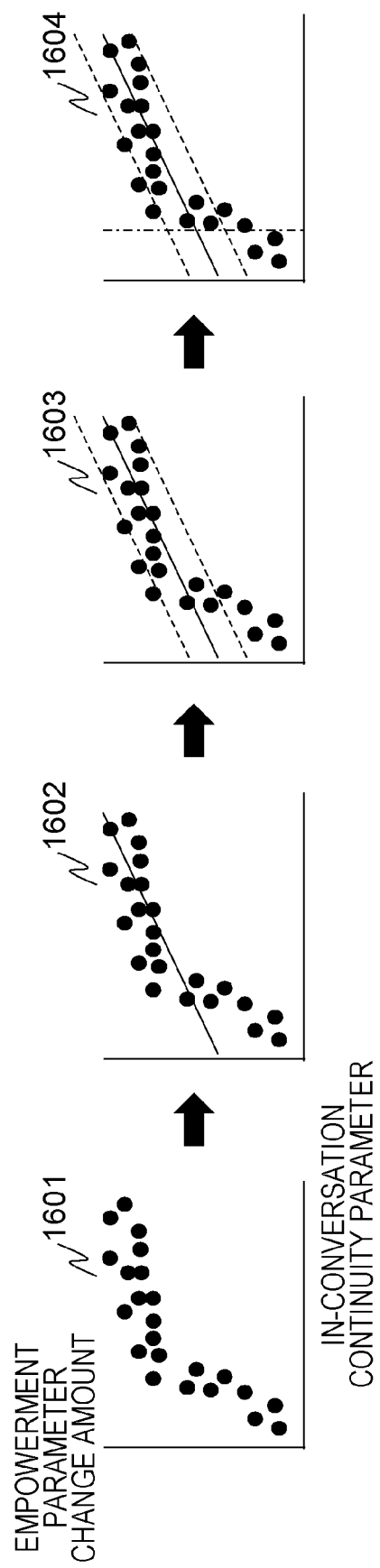
FIG. 16 is a diagram illustrating a concept of a method of updating a conversation parameter threshold value in the first embodiment.

FIG. 15 is a flowchart for describing an example of a process executed by the conversation information learning module 102 of the first embodiment. FIG. 16 is a diagram illustrating a concept of a method of updating the conversation parameter threshold value in the first embodiment.

When an instruction is periodically received from the administrator, the conversation information learning module 102 executes the process to be described below. In the present process, the selection policy information 313 and the conversation learning information 314 are updated.

The conversation information learning module 102 determines whether or not a number of entries necessary for processing are stored in the conversation history information 311 (step S201).

Specifically, the conversation information learning module 102 determines whether or not the number of entries stored in the conversation history information 311 is a threshold value or more. The threshold value is set in advance. The threshold value may be changed appropriately.

When a number of entries necessary for processing are determined not to be stored in the conversation history information 311, the conversation information learning module 102 returns to step S201 after a certain period of time elapses and executes a similar process.

When a number of entries necessary for processing are determined to be stored in the conversation history information 311, the conversation information learning module 102 generates the change amount analysis information 318 (step S202). Specifically, the change amount analysis information 318 is generated in accordance with the following procedure.

(Procedure 1)

The conversation information learning module 102 generates the empty change amount analysis information 318 and also selects one target entry from the conversation history information 311.

(Procedure 2)

The conversation information learning module 102 calculates the change amount of the conversation parameter of each attribute using the value of the conversation parameter of each attribute after the conversation information included in the target entry is output and the value of the conversation parameter of each attribute before the conversation information is output.

In the present embodiment, the conversation information learning module 102 calculates the empowerment parameter change amount from the pre-conversation empowerment parameter 405 and the post-conversation empowerment parameter 406, and calculates the continuity parameter change amount and in-conversation continuity parameter from the pre-conversation continuity parameter 408 and the post-conversation continuity parameter 409.

(Procedure 3)

The conversation information learning module 102 adds an entry to the change amount analysis information 318 and sets the ID 401 of the target entry as the reference ID 1101 of the added entry. The conversation information learning module 102 sets the calculated change amount of the conversation parameter in the added entry. At this point of time, the information for deciding the threshold value of the conversation parameter is not added and set in the entry.

In the present embodiment, the conversation information learning module 102 sets the value calculated in (procedure 2) in the empowerment parameter change amount 1102, the continuity parameter change amount 1103, and the in-conversation continuity parameter 1104 of the added entry.

The conversation information learning module 102 executes the process of (procedure 2) and (procedure 3) for all the entry included in the conversation history information 311. The above description is description of the process of step S201.

Then, the conversation information learning module 102 executes the process of step S203 to step S206 and updates the conversation parameter threshold value. First, the conversation information learning module 102 generates the parameter correlation analysis information 319 using the change amount analysis information 318 (step S203). Specifically, the parameter correlation analysis information 319 is generated in accordance with the following procedure.

(Procedure 1)

The conversation information learning module 102 generates the parameter correlation analysis information 319 including one entry, sets the identification number in the ID 1201 of the generated entry, and sets the name indicating the attribute of the conversation parameter.

In the present embodiment, the conversation information learning module 102 acquires the names of the empowerment parameter and the continuity parameter from the conversation history information 311 on the basis of the reference ID 1101 of the change amount analysis information 318, and sets the acquired names in the empowerment parameter name 1203 and the continuity parameter name 1205.

(Procedure 2)

The conversation information learning module 102 selects a target conversation parameter from among the conversation parameters of a plurality of attributes and acquires the change amount of the target conversation parameter and the feature quantity used in the relational expression for calculating the target conversation parameter from the conversation history information 311 and the change amount analysis information 318.

In the present embodiment, the conversation information learning module 102 selects the empowerment parameter and the continuity parameter as the target conversation parameter. In a case in which the empowerment parameter is selected as the target conversation parameter, the conversation information learning module 102 acquires the empowerment parameter change amount 1102 and the in-conversation continuity parameter 1104 from each entry of the change amount analysis information 318. In a case in which the continuity parameter is selected as the target parameter, the conversation information learning module 102 acquires the continuity parameter coefficient 1206 of each entry of the change amount analysis information 318, and acquires the pre-conversation continuity parameter 408 of the entry corresponding to each entry of the change amount analysis information 318 with reference to the conversation history information 311.

(Procedure 3)

The conversation information learning module 102 calculates the coefficient of the relational expression of the target parameter by using the relational expression, the change amount of the target conversation parameter, and the feature quantity. The conversation information learning module 102 sets the coefficient of the target conversation parameter in the entry.

In the present embodiment, in a case in which the empowerment parameter is selected as the target parameter in (procedure 2), the conversation information learning module 102 calculates the empowerment parameter coefficient and sets the calculated value in the empowerment parameter coefficient 1204. In a case in which the continuity parameter is selected as the target parameter in (procedure 2), the conversation information learning module 102 calculates the continuity parameter coefficient and sets the calculated value in the continuity parameter coefficient 1206.

The conversation information learning module 102 executes the process of (procedure 2) and (procedure 3) on the conversation parameters of all attributes. The above description is description of the process of step S203.

Then, the conversation information learning module 102 executes the statistical analysis process using the conversation history information 311, the change amount analysis information 318, and the parameter correlation analysis information 319 (step S204). That is, information for deciding the threshold value of the conversation parameter is calculated. Information is calculated in accordance with the following procedure using a specific example.

(Procedure 1)

The conversation information learning module 102 selects the target entry from the change amount analysis information 318.

(Procedure 2)

The conversation information learning module 102 acquires the feature quantity of the conversation parameter of each attribute from the target entry and the entry corresponding to the target entry of the conversation history information 311. Further, the conversation information learning module 102 calculates an expected change amount of the conversation parameter of each attribute on the basis of the feature quantity, the relational expression of the conversation parameter, and the coefficient set in the parameter correlation analysis information 319.

In the present embodiment, the conversation information learning module 102 calculates an expected empowerment parameter change amount by substituting the in-conversation continuity parameter 1104 and the empowerment parameter coefficient 1204 into the relational expression. Further, the conversation information learning module 102 calculates an expected continuity parameter change amount by substituting the pre-conversation continuity parameter 408 and the continuity parameter coefficient 1206 into the relational expression.

(Procedure 3)

The conversation information learning module 102 determines whether or not the conversation parameter of each attribute satisfies a predetermined condition on the basis of the target entry and the parameter correlation analysis information 319, and sets the determination result in the target entry as the information for deciding the threshold value of the conversation parameter.

In the present embodiment, the conversation information learning module 102 determines whether or not the empowerment parameter change amount satisfies a condition indicated by Formula (1). Here, a range upper limit value is calculated on the basis of Formula (2), and a range lower limit value is calculated on the basis of Formula (3). In a case in which Formula (1) is satisfied, "OK is stored in the empowerment determination result 1105, and in a case in which Formula (1) is not satisfied, "NG" is stored in the empowerment determination result 1105.

[Math. 1]

$$\text{(range lower limit value)} \leq \text{(empowerment parameter change amount } \mathbf{1102}\text{)} \leq \text{(range upper limit value)} \quad (1)$$

[Math. 2]

$$\text{Expected empowerment parameter change amount} \times 1.0 \quad (2)$$

[Math. 3]

$$\text{Expected empowerment parameter change amount} \times 0.95 \quad (3)$$

Further, the conversation information learning module 102 determines whether or not the continuity parameter change amount satisfies a condition expressed by Formula (4) on the basis of the value of the target entry and the parameter correlation analysis information 319. Here, a range upper limit value is calculated on the basis of Formula (5), and a range lower limit value is calculated on the basis of Formula (6). In a case in which Formula (4) is satisfied, "OK" is stored in the continuity determination result 1106, and in a case in which Formula (4) is not satisfied, "NG" is stored in the continuity determination result 1106.

[Math. 4]

$$\text{(range lower limit value)} \leq \text{(continuity parameter change amount } \mathbf{1103}\text{)} \leq \text{(range upper limit value)} \quad (4)$$

[Math. 5]

$$\text{Expected continuity parameter change amount} \times 1.0 \quad (5)$$

[Math. 6]

$$\text{Expected continuity parameter change amount} \times 0.95 \quad (6)$$

The conversation information learning module 102 executes the process of (procedure 2) and (procedure 3) on all the entries of the change amount analysis information 318.

In addition to the above-described determination method, the determination method using a standard deviation of the expected empowerment parameter change amount and the expected continuity parameter change amount or the like may be used. The above description is description of the process of step S204.

Then, the conversation information learning module 102 calculates a conversation parameter threshold value for correction on the basis of the result of the statistical analysis process (step S205).

Specifically, the conversation information learning module 102 selects the target conversation parameter from the selection policy information 313. The conversation information learning module 102 calculates the threshold value on the basis of the result of the statistical analysis process of the target conversation parameter of each entry of the change amount analysis information 318. In the present embodiment, the conversation information learning module 102 selects the empowerment parameter and the continuity parameter as the target conversation parameter. In a case in which the empowerment parameter is selected as the target conversation parameter, the conversation information learning module 102 calculates an empowerment threshold value for correction on the basis of the empowerment determination result 1105 and the in-conversation continuity parameter 1104 of each entry of the change amount analysis information 318. For example, in a case in which the empowerment determination results 1105 of all the entries in which the in-conversation continuity parameter 1104 is less than "60" are "NG, and there is an entry in which the in-conversation continuity parameter 1104 is "60," and the empowerment determination result 1105 is "OK," the empowerment threshold value for correction is calculated as "60." Further, in a case in which the continuity parameter is selected as the target conversation parameter, the conversation information learning module 102 calculates a continuity threshold value for correction on the basis of the continuity determination result 1106 and the pre-conversation continuity parameter 408 of each entry of the change amount analysis information 318. In a case in which the continuity determination results 1106 of all the entries in which the pre-conversation continuity parameter 408 is "40" or more are "NG," and there is an entry in which the pre-conversation continuity parameter 408 is "40," and the continuity determination result 1106 is "OK," the continuity threshold value for correction is calculated as "40." The above description is description of the process of step S205.

Then, the conversation information learning module 102 updates the selection policy information 313 (step S206).

Specifically, the conversation information learning module 102 updates the threshold value of the conversation parameter of each attribute on the basis of the conversation parameter threshold value for correction calculated in step S205.

In the present embodiment, the conversation information learning module 102 changes the values of empowerment threshold value 602 and the continuity threshold value 604 to the empowerment threshold value for correction and the continuity threshold value for correction.

The conversation information learning module 102 may update the conversation parameter threshold value only when a condition is satisfied. For example, in a case in which a difference between the empowerment threshold value for correction and the empowerment threshold value 602 before updating is smaller than a threshold value, the empowerment threshold value 602 and the continuity threshold value 604 may not be updated.

The conversation information learning module 102 may correct the updated conversation parameter threshold value on the basis of a condition. For example, in a case in which the continuity threshold value 604 is larger than the empowerment threshold value 602, the continuity threshold value 604 may be corrected to be equal to the empowerment threshold value 602. The above description is description of the process of step S206.

Here, the flow of the process of step S202 to step S206 will be described with reference to FIG. 16. FIG. 16 illustrates the flow of the process of updating the empowerment threshold value.

The conversation information learning module 102 executes the process of step S202 and step S203, generates a graph indicating a correlation of the continuity parameter and the empowerment parameter change amount (graph 1601), and calculates the coefficient of the relational expression from the graph (graph 1602). Accordingly, a relational expression indicated by a graph 1602 is calculated.

The conversation information learning module 102 executes the process of step S204 and calculates a range for selecting the conversation information for improving the word memorization ability (graph 1603). A chain line shown in the graph 1603 indicates the calculated range.

Further, the conversation information learning module 102 executes the process of step S204, and corrects the empowerment threshold value so that the parameter is not included when there is an in-conversation continuity parameter which is not included in the calculated range (graph 1604). An alternate long and short dashed line shown in the graph 1604 indicates the empowerment threshold value.

A combination of parameters having a correlation or the like are not limited to the combination of the empowerment parameter change amount and the in-conversation continuity parameter and may be a combination of other parameters such as a combination of the empowerment parameter change amount and the pre-conversation empowerment parameter, a combination of the continuity parameter change amount and the pre-conversation continuity parameter, or the like. The above description is description of FIG. 16.

The description of FIG. 15 is returned.

Then, the conversation information learning module 102 executes the process of step S207 to step S208 and updates the conversation learning information 314. First, the conversation information learning module 102 generates the conversation/parameter correlation analysis information 320 (step S207). Specifically, the conversation/parameter correlation analysis information 320 is generated in accordance with the following procedure.

(Procedure 1)

The conversation information learning module 102 generates the empty conversation/parameter correlation analysis information 320. The conversation information learning module 102 specifies combinations of the values of the conversation parameters before the conversation information is output with reference to the conversation history information 311. The conversation information learning module 102 selects a target combination from among the specified combinations.

In the present embodiment, the conversation information learning module 102 specifies combination of the values of the empowerment parameter and the continuity parameter, and selects a target combination from the specified combinations.

(Procedure 2)

The conversation information learning module 102 adds an entry to the conversation/parameter correlation analysis information 320 and sets an identification number in the ID 1301 of the added entry. Further, the conversation information learning module 102 sets the value of the conversation parameter of each attribute corresponding to the target combination in the added entry.

In the present embodiment, the conversation information learning module 102 sets the name of the conversation parameter in the empowerment parameter name 1303 and the continuity parameter name 1305 of the added entry. Further, the conversation information learning module 102 sets a value in the pre-conversation empowerment parameter 1304 and the pre-conversation continuity parameter 1306 of the added entry.

(Procedure 3)

The conversation information learning module 102 searches for an entry in which a combination of the values of the conversation parameters of each attribute before conversation coincides with the target combination from the conversation history information 311. Further, the conversation information learning module 102 acquires the change amount of the conversation parameter from the entry corresponding to each searched entry with reference to the change amount analysis information 318.

In the present embodiment, the conversation information learning module 102 acquires empowerment parameter change amount 1102 and continuity parameter change amount 1103.

(Procedure 4)

The conversation information learning module 102 generates high-quality conversation information and low-quality conversation information of the conversation parameter of each attribute on the basis of the size of the change amount of the conversation parameter of each attribute. For example, methods such as (generation method 1) and (generation method 2) may be used.

(Generation Method 1)

The conversation information learning module 102 specifies an entry whose change amount of the conversation parameter is maximum among the acquired entries and generates the conversation information of the specified entry as the high-quality conversation information. Further, the conversation information learning module 102 specifies an entry whose change amount of the conversation parameter is minimum among the acquired entries, and generates the conversation information of the specified entry as the low-quality conversation information.

(Generation Method 2)

The conversation information learning module 102 selects three entries in the descending order of the change amounts of the conversation parameters, and generates the conversation information of each of the selected entries as the high-quality conversation information. Further, the conversation information learning module 102 selects three entries in the ascending order of the change amounts of the conversation parameters, and generates the conversation information of each of the selected entries as the low-quality conversation information. The number of entries to be selected is not limited.

In the present embodiment, the conversation information learning module 102 generates the high-quality conversation information and the low-quality conversation information of the empowerment parameter and generates the high-quality conversation information and the low-quality conversation information of the continuity parameter.

(Procedure 5)

The conversation information learning module 102 generates an enhancement conversation and a weakening conversation of the conversation parameters of each attribute on the basis of the high-quality conversation information and the low-quality conversation information of the conversation parameter of each attribute. For example, methods such as (generation method 3) and (generation method 4) may be used.

(Generation Method 3)

The conversation information learning module 102 generates the high-quality conversation information and the low-quality conversation information of the conversation parameter of each attribute as the enhancement conversation and the weakening conversation of the conversation parameter of each attribute.

(Generation Method 4)

The conversation information learning module 102 generates the enhancement conversation and the weakening conversation of the conversation parameter of the attribute from a comparison result of the high-quality conversation information and the low-quality conversation information of the conversation parameter of one attribute. For example, the conversation information learning module 102 extracts nouns, adjectives, and the like included only in the high-quality conversation information of empowerment parameter, and generates the empowerment enhancement conversation 1307.

In the present embodiment, the conversation information learning module 102 generates the enhancement conversation and the weakening conversation of the empowerment parameter, and generates the enhancement conversation and the weakening conversation of the continuity parameter.

(Procedure 6)

The conversation information learning module 102 sets the enhancement conversation and the weakening conversation of the conversation parameter of each attribute in the entry added to the conversation/parameter correlation analysis information 320.

In the present embodiment, the conversation information learning module 102 sets the information generated in (procedure 5) in the empowerment enhancement conversation 1307, the empowerment weakening conversation 1308, the continuity enhancement conversation 1309, and the continuity weakening conversation 1310 of the added entry.

The conversation information learning module 102 executes the process of (procedure 2) to (procedure 6) for a combination of the values of all the conversation parameters.

In the above description, the high-quality conversation information and the low-quality conversation information of each conversation parameter are generated on the basis of the change amount of the conversation parameter of each attribute, but the high-quality conversation information and low-quality conversation information of the conversation parameter may be generated on the basis of the conversation content. For example, the conversation information including a specific term or a specific conversation content may be generated as the high-quality conversation information.

In the present embodiment, a combination of the values of the conversation parameter of each attribute is used as a unit, but the preset invention is not limited to this example. For example, the value of the conversation parameter of each attribute may be divided into a plurality of ranges, and the process may be performed using a combination of ranges as a unit. The above description is description of the process of step S207.

Then, the conversation information learning module 102 updates the conversation learning information 314 using the conversation/parameter correlation analysis information 320 (step S208), and then ends the process. Specifically, the conversation learning information 314 is updated in accordance with the following procedure.

(Procedure 1)

The conversation information learning module 102 selects one target entry from the conversation learning information 314 and further selects one target row from the target entry. The conversation information learning module 102 searches for an entry in which a combination of the values of the conversation parameters of each attribute coincides with a combination of the values of the target entry with reference to the conversation/parameter correlation analysis information 320.

(Procedure 2)

The conversation information learning module 102 generates the correction conversation information on the basis of the conversation information of the target row and the enhancement conversation and the weakening conversation of the conversation parameters of each attribute of the searched entry.

For example, when there is no overlapping portion between the conversation information of the selected row and the enhancement conversation and the weakening conversation of each conversation parameter, the conversation information learning module 102 generates the non-corrected conversation information as the correction conversation information. When there is an overlapping portion between the conversation information of the selected row and the enhancement conversation of each conversation parameter, the conversation information learning module 102 generates the correction conversation information using the term or the like included in the enhancement conversation of each conversation parameter. When there is an overlapping portion between the conversation information of the selected row and the weakening conversation of each conversation parameter, the conversation information learning module 102 deletes the corresponding row. Further, when there is an overlapping portion between the conversation information of the selected row and the enhancement conversation and the weakening conversation of each conversation parameter, the conversation information learning module 102 generates the correction conversation information from the enhancement conversation of the conversation parameter, and performs the correction so that the term or the like included in the weakening conversation of each conversation parameter is not included in the correction conversation information.

In the present embodiment, the conversation information learning module 102 generates the correction conversation information using the enhancement conversation and the weakening conversation of the empowerment parameter and the enhancement conversation and the weakening conversation of the continuity parameter.

(Procedure 3)

The conversation information learning module 102 decides the correction selection parameter on the basis of the correction conversation information and the conversation information of the target row.

For example, when there is an overlapping portion between the correction conversation information and the conversation information of the target row, the conversation information learning module 102 decides the selection parameter of the selected row as the correction selection parameter. When there is no overlapping portion between the correction conversation information and the conversation information of the target row, the conversation information learning module 102 compares the conversation information of each row included in the target entry with the correction conversation information, calculates a degree of similarity such as a degree of importance of the term, and decides the selection parameter of the row corresponding to the conversation information with the highest degree of similarity as the correction selection parameter.

In the present embodiment, the conversation information learning module 102 decides one of the empowerment parameter and the continuity parameter as the correction selection parameter.

(Procedure 4)

The conversation information learning module 102 calculates a corrected probability.

For example, when there is no overlapping portion between the conversation information of the target row and the enhancement conversation and the weakening conversation of the conversation parameter of each attribute, the conversation information learning module 102 calculates the same value as the probability before the correction as the corrected probability. When there is an overlapping portion the conversation information of the target row and the enhancement conversation of the conversation parameter of each attribute, the conversation information learning module 102 calculates a value larger than the probability of the target row as the corrected probability. Further, when there is an overlapping portion between the conversation information of the target row and the weakening conversation of the conversation parameter of each attribute, the conversation information learning module 102 calculates a value smaller than the probability of the target row as the corrected probability. If there is no overlapping portion between the conversation information of the target row and the correction conversation information, the conversation information learning module 102 calculates a degree of similarity between the correction conversation information and the conversation information of another row, and calculates the probability of the row corresponding to the conversation information with the highest degree of similarity as the corrected probability.

The conversation information learning module 102 executes the process of (procedure 2) to (procedure 4) on all the rows included in the target entry. Further, the conversation information learning module 102 corrects the probability of each row so that a sum of the probabilities of the rows having the same selection parameter becomes 100% after the process is performed on all the rows included in the target entry.

The conversation information learning module 102 executes a similar process on all the entry included in the conversation learning information 314. The above description is description of the process of step S208.

It is possible to generate the algorithm and the conversation information for performing the effective empowerment through the learning process illustrated in FIG. 15.

Figure 17:
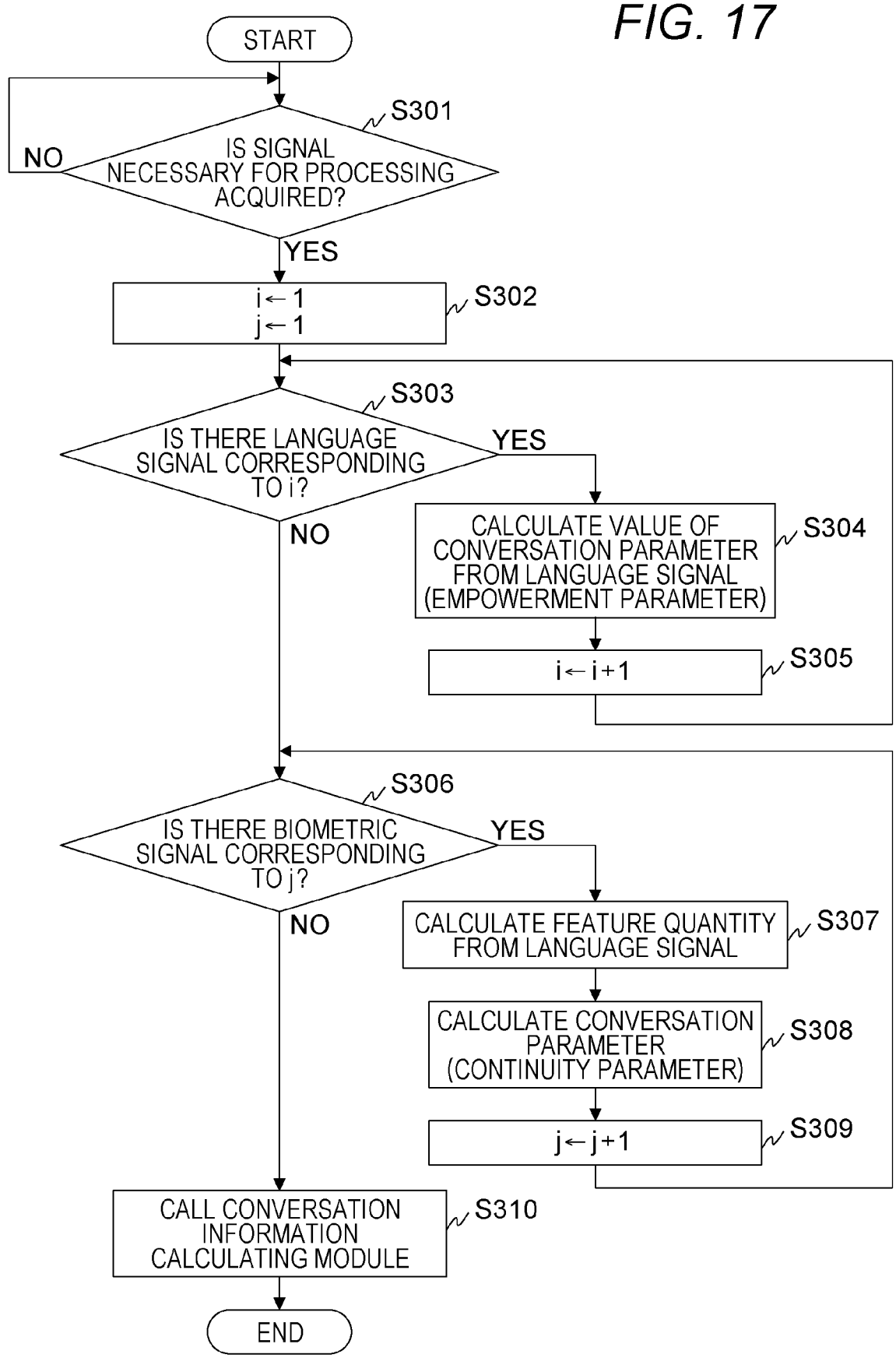
FIG. 17 is a flowchart illustrating an example of a process executed by a conversation parameter calculating module according to the first embodiment.

FIG. 17 is a flowchart illustrating an example of a process executed by the conversation parameter calculating module 103 of the first embodiment.

The conversation parameter calculating module 103 determines whether or not a signal necessary for processing is acquired (step S301).

A type of signal and the number of signals necessary for the process are assumed to have been already set. The administrator may perform the determination. Here, the conversation information learning module 102 acquires at least one biometric signal and one language signal.

Further, in a case in which the biometric signal is acquired, the conversation parameter calculating module 103 adds an entry corresponding to the acquired biometric signal to the biometric signal information 315, and when the language signal is acquired, the conversation parameter calculating module 103 adds an entry corresponding to the language signal to the language signal information 317.

When the signal necessary for processing is determined not to be acquired, the conversation parameter calculating module 103 repeatedly executes step S301 until the signal necessary for processing can be acquired.

When the signal necessary for processing is determined to be acquired, the conversation parameter calculating module 103 sets an initial value "1" to a variable "j" indicating the identification number of the biometric signal, and also sets an initial value "1" to a variable "i" indicating the identification number of the language signal (step S302).

Then, the conversation parameter calculating module 103 determines whether or not there is an entry of the language signal corresponding to the variable "i" in the language signal information 317 (step S303).

Specifically, the conversation parameter calculating module 103 determines whether there is an entry whose ID 1001 coincides with the variable "i."

If it is determined that there is an entry of the language signal corresponding to the variable "i" in the language signal information 317, the conversation parameter calculating module 103 calculates the value of the conversation parameter that can be calculated from the conversation content corresponding to the language signal (step S304).

The conversation parameter calculating module 103 executes a recognition process on the measured value of the entry searched in step S303 and calculates the conversation content. The conversation parameter calculating module 103 calculates the conversation parameter in accordance with the calculation method using the conversation content. The conversation parameter calculating module 103 stores the type of the conversation parameter and the value of the conversation parameter in the storage device 302 in association with each other.

In the present embodiment, the value of the empowerment parameter is calculated. For example, the conversation parameter calculating module 103 calculates a correct answer rate for the problem included in the conversation information as the value of the empowerment parameter. More specifically, for the correct answer rate corresponding to the problem, a proportion of the number of correct answer words included in the conversation content to the number of words of the correct answer of the problem is calculated as the value of the empowerment parameter.

Then, the conversation parameter calculating module 103 adds "1" to the variable "i," updates the variable "i" (step S305), and then returns to step S303.

When it is determined in step S303 that there is no entry of the language signal corresponding to the variable "i" in the language signal information 317, the conversation parameter calculating module 103 determines whether or not there is an entry of the biometric signal corresponding to the variable "j" in the biometric signal information 315 (step S306).

When it is determined that there is an entry of the biometric signal corresponding to the variable "j" in the biometric signal information 315, the conversation parameter calculating module 103 calculates the feature quantity used for calculating the value of the conversation parameter that can be calculated from the biometric signal (step S307). As a method of calculating the feature quantity, for example, the method described in M Z Poh et al., "Advancements in noncontact, multiparameter physiological measurements using a webcam," IEEE Transactions on Biomedical Engineering, vol. 58, no. 1, pp. 7-11 (2011) is used.

Then, the conversation parameter calculating module 103 calculates the conversation parameter on the basis of the conversation parameter learning information 312 and the calculated feature quantity (step S308).

Specifically, the conversation parameter calculating module 103 specifies the entry of the conversation parameter corresponding to the feature quantity with reference to the conversation parameter learning information 312, and calculates the conversation parameter using the conversation parameter calculation method, the coefficient of the specified entry, and the calculated feature parameter. The conversation parameter calculating module 103 stores the type of the conversation parameter and the value of the conversation parameter in the storage device 302 in association with each other. In the present embodiment, the continuity parameter is calculated in step S308.

Then, the conversation parameter calculating module 103 adds 1 to variable "j," updates the variable "j" (step S309), and then returns to step S306.

When it is determined in step S306 that there is no entry of biometric signal corresponding to the variable "j" in the biometric signal information 315, the conversation parameter calculating module 103 calls the conversation information calculating module 104 (step S310), and then ends the process.

Further, in a case in which a plurality of biometric signals are acquired using a plurality of measuring devices or a plurality of measurement channels, a similar process can be executed using an average value of measured values of a plurality of biometric signals. Further, the empowerment parameter such as the word memorization ability may be calculated using information other than the language signal such as an answer sheet.

Figure 18:
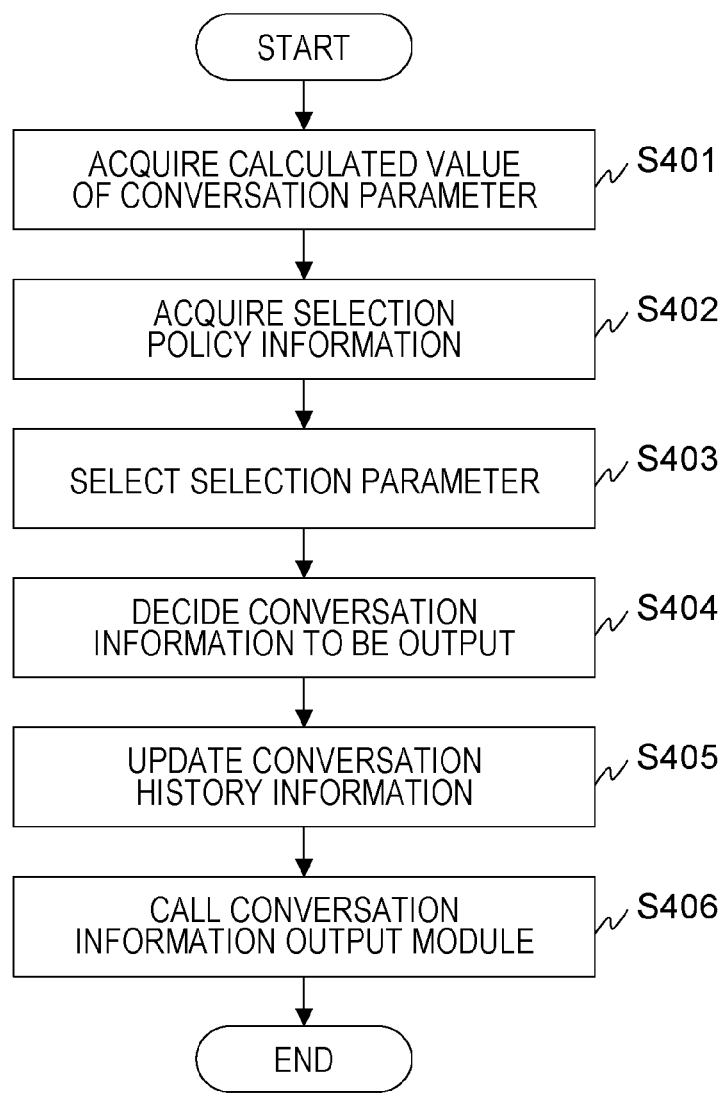
FIG. 18 is a flowchart illustrating an example of a process executed by a conversation information calculating module according to the first embodiment.

FIG. 18 is a flowchart for describing an example of a process executed by the conversation information calculating module 104 of the first embodiment.

After the conversation information calculating module 104 is called from the conversation parameter calculating module 103, the conversation information calculating module 104 acquires the value of the conversation parameter of each attribute calculated by the conversation parameter calculating module 103 from the storage device 302 (step S401).

In the present embodiment, the conversation information calculating module 104 acquires the value of the empowerment parameter and the value of the continuity parameter.

Then, the conversation information calculating module 104 acquires the selection policy information 313 (step S402).

Then, the conversation information calculating module 104 selects the selection parameter on the basis of the acquired value of the conversation parameter of each attribute and the selection policy information 313 (step S403).

The selection parameter selection method is set as definition information and can be changed appropriately.

In the present embodiment, the conversation information calculating module 104 selects the empowerment parameter as the selection parameter when the value of the continuity parameter is larger than the empowerment threshold value 602, and selects the continuity parameter as the selection parameter when the value of the continuity parameter is smaller than the continuity threshold value 604. When it corresponds to none of the above-described conditions, the conversation information calculating module 104 randomly selects any one of the empowerment parameter and the continuity parameter as the selection parameter. Further, in a case in which the selection parameter is randomly selected, the conversation information calculating module 104 may use a method of alternately selecting the continuity parameter and the empowerment parameter by selecting a conversation parameter different from the selection parameter which is previously used with reference to the selection parameter which is previously used.

Then, the conversation information calculating module 104 decides the conversation information to be output (step S404). Specifically, the following process is executed.

The conversation information calculating module 104 searches for an entry in which a combination of the values of the conversation parameters of each attribute coincides with a combination of the acquired values of the conversation parameter of each attribute with reference to the conversation learning information 314. In the present embodiment, the conversation information calculating module 104 searches for an entry in which a combination of the values of the empowerment parameter 703 and the continuity parameter 705 coincides with a combination of the acquired values of the empowerment parameter and the continuity parameter.

The conversation information calculating module 104 specifies a row in which the selection parameter 707 coincides with the selection parameter selected in step S403 from the searched entry. The conversation information learning module 102 selects one row on the basis of the probability of each specified row. Since a method of selecting information on the basis of the learning information is well-known, detailed description thereof is omitted.

The conversation information learning module 102 decides the conversation information set in the conversation information 706 of the selected row as the conversation information to be output. The above description is description of the process of step S404.

Then, the conversation information calculating module 104 updates the conversation history information 311 (step S405).

Specifically, the conversation information calculating module 104 adds an entry to the conversation history information 311 and sets an identification number in the ID 401 of the added entry. Further, the conversation information calculating module 104 sets the decided conversation information, the selected selection parameter, and the name of the conversation parameter of each attribute in the added entry. Furthermore, the conversation information calculating module 104 sets the calculated value of the conversation parameter of each attribute in the added entry as the value of the conversation parameter of each attribute before conversation.

Then, the conversation information calculating module 104 calls the conversation information output module 105 (step S406), and then ends the process.

At this time, the conversation information calculating module 104 inputs the decided conversation information to the conversation information output module 105. Further, the conversation information calculating module 104 also inputs the ID 401 or the like of the entry added to the conversation history information 311. This is to specify the entry updated by the conversation information output module 105.

Figure 19:
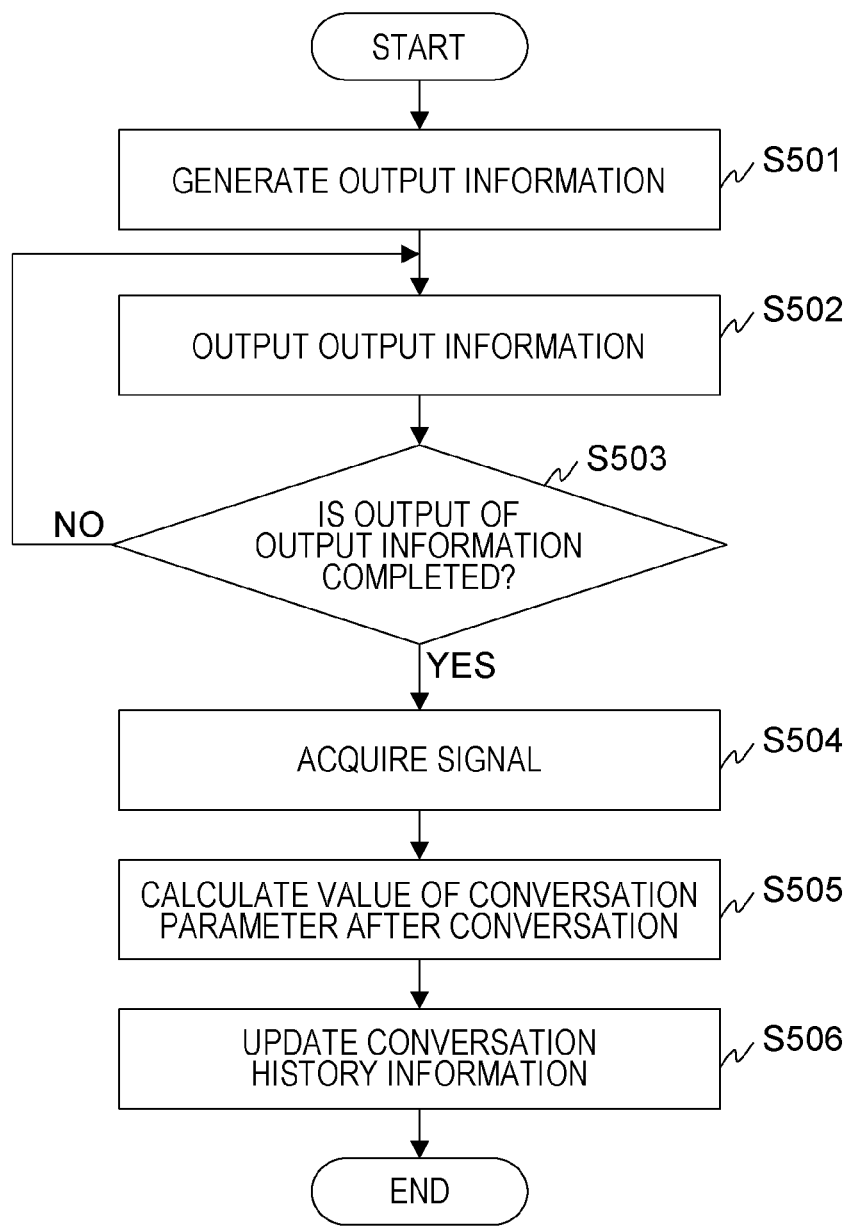
FIG. 19 is a flowchart illustrating an example of a process executed by a conversation information output module according to the first embodiment.

FIG. 19 is a flowchart illustrating an example of a process executed by the conversation information output module 105 of the first embodiment.

The conversation information output module 105 generates output information by using the conversation information decided by the conversation information calculating module 104 (step S501). The output information includes information such as voice information and image information.

Then, the conversation information output module 105 outputs the output information to the display device 130 or the conversation output device 140 via the output interface 304 (step S502).

A device that outputs the output information can be decided in accordance with a type of information included in output information or the like. Further, the conversation information and the device may be associated with each other.

Further, in a case in which a screen or the like is switched in accordance with an interaction between the computer 100 and the user, the conversation information output module 105 may generate the output information for each screen and output the output information in accordance with an operation status.

The output information may be also output to the administrator of the computer 100 or the like instead of the user.

Then, the conversation information output module 105 determines whether or not the output of the output information is completed (step S503).

When the output of the output information is determined not to be completed, the conversation information output module 105 returns to step S502 and executes a similar process. Further, when it is necessary to generate the output information, the conversation information output module 105 may return to step S501.

When the output of the output information is determined to be completed, the conversation information output module 105 acquires the biometric signal and the language signal after the output information corresponding to the conversation information is output (step S504), and calculates the value of the conversation parameter of each attribute after conversation (step S505). A method of calculating the value of the conversation parameter is the same as the process described in FIG. 17, and thus description thereof is omitted. The conversation information output module 105 may output an instruction to calculate the value of the conversation parameter of each attribute to the conversation information calculating module 104.

Then, the conversation information output module 105 updates the conversation history information 311 (step S506), and then ends the process.

Specifically, the conversation information output module 105 sets the calculated value of the conversation parameter of each attribute, that is, the value of the conversation parameter of each attribute after conversation in the entry added to the conversation history information 311 by the conversation information calculating module 104.

According to the first embodiment, the computer 100 can switch the selection algorithm on the basis of a value of a conversation parameter having a different attribute and output the conversation information for improving the state of the user. Further, it is possible to improve the accuracy of processing by correcting the selection algorithm on the basis of the history of the conversation information. Accordingly, the effective empowerment can be realized.

Second Embodiment

In a second embodiment, a system in which empowerment intended for improving power of idea which is difficult to evaluate from the language information. In the second embodiment, a parameter for evaluating the power of idea is used as the empowerment parameter. Hereinafter, the second embodiment will be described focusing on a difference from the first embodiment.

In the second embodiment, the conversation parameter learning module 101 executes the learning process in view of the continuity parameter in addition to the empowerment parameter. Further, the conversation parameter calculating module 103 calculates the value of the empowerment parameter on the basis of the language signal and the biometric signal.

A system configuration and a hardware configuration and a software configuration of the computer 100 according to the second embodiment are the same as in the first embodiment. The processes executed by the conversation information learning module 102, the conversation information calculating module 104, and the conversation information output module 105 are the same as in the first embodiment. Here, the computer 100 holds the conversation parameter learning information 312 and the biometric signal analysis information 316 for each attribute of the conversation parameter.

FIGS. 20A and 20B are diagrams illustrating an example of the conversation parameter learning information 312 of the second embodiment.

FIG. 20A illustrates the conversation parameter learning information 312 for the continuity parameter which has the same configuration as the conversation parameter learning information 312 illustrated in FIG. 5. FIG. 20B illustrates the conversation parameter learning information 312 for the empowerment parameter. The continuity parameter name 502 and continuity parameter coefficient 503 are an empowerment parameter name 2002 and an empowerment parameter coefficient 2003.

FIGS. 21A and 21B are diagrams illustrating an example of the biometric signal analysis information 316 of the second embodiment.

FIG. 21A illustrates the biometric signal analysis information 316 for the continuity parameter which has the same configuration as the biometric signal analysis information 316 illustrated in FIG. 9. FIG. 21B illustrates the biometric signal analysis information 316 for the empowerment parameter. The continuity parameter name 903 and the continuity parameter 904 are an empowerment parameter name 2103 and an empowerment parameter 2104.

In the second embodiment, a problem for learning is prepared for each attribute of the conversation parameter. Therefore, the biometric signal analysis information 316 is generated for each attribute of the conversation parameter.

Figure 22:
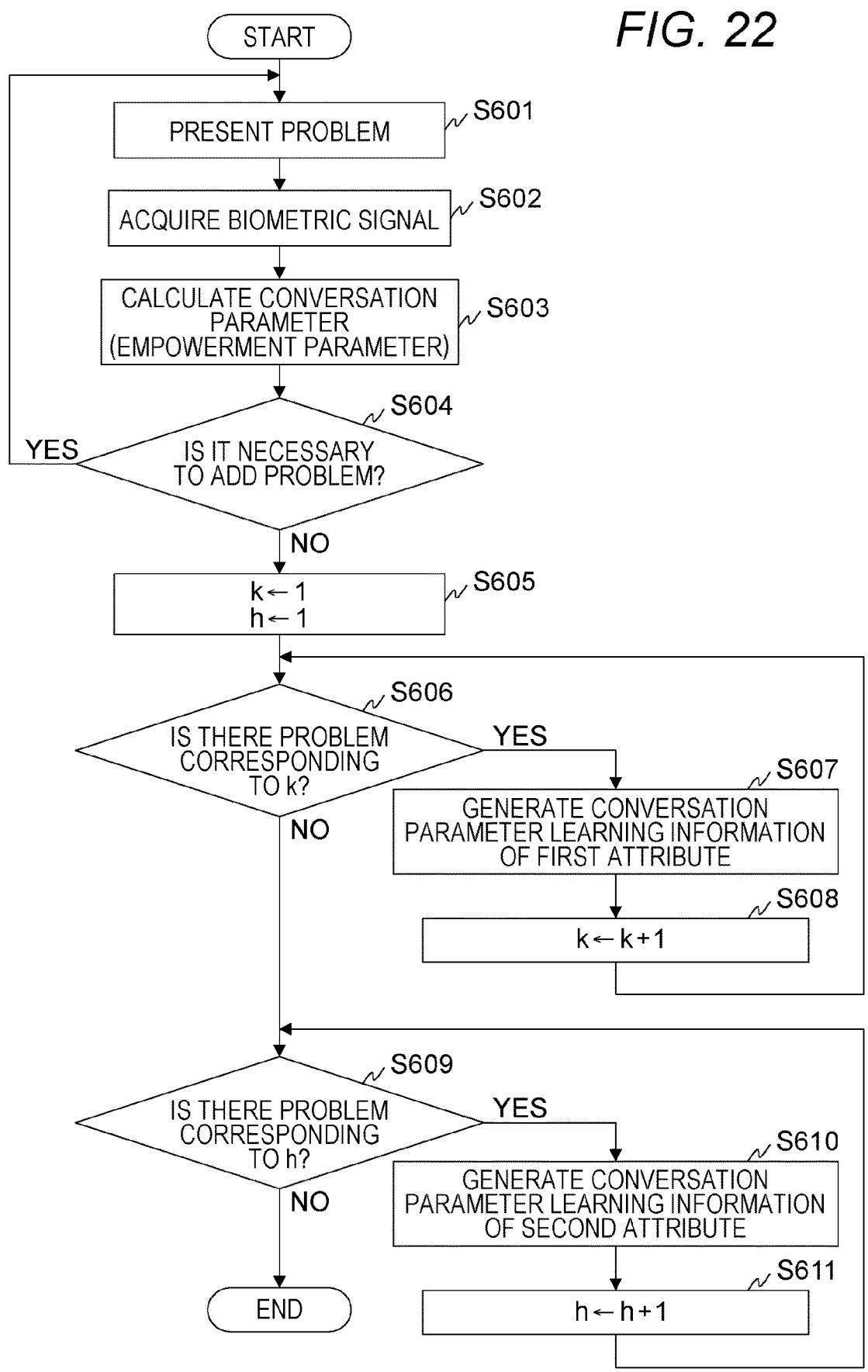
FIG. 22 is a flowchart illustrating an example of a process executed by a conversation parameter learning module according to the second embodiment.

FIG. 22 is a flowchart for describing an example of a process executed by the conversation parameter learning module 101 of the second embodiment.

The conversation parameter learning module 101 presents the problem used for learning to the user (step S601).

The process of step S601 is partially different from the process of step S101. Specifically, the problem for learning to be presented differs for each attribute of the conversation parameter. Here, a problem for learning a conversation parameter of a first attribute (empowerment parameter) and a conversation parameter of a second attribute (continuity parameter) is assumed to be presented. Further, an identification number is assigned to each problem of attribute in order starting from "1."

Then, the conversation parameter learning module 101 acquires the biometric signal via the input interface 303 (step S602), and also calculates the value of the conversation parameter of the attribute corresponding to the problem (step S603).

The process of step S602 is the same as the process of step S202. In step S603, the biometric signal analysis information 316 of the conversation parameter of the first attribute and the biometric signal analysis information 316 of the conversation parameter of the second attribute are generated. A method of setting a value of each field is similar to that of step S103.

In the second embodiment, the conversation parameter learning module 101 calculates the number of ideas as the empowerment parameter from the language signal information 317 and the biometric signal analysis information 316 of the empowerment parameter.

Then, the conversation parameter learning module 101 determines whether it is necessary to add a problem (step S604). The process of step S604 is similar to the process of step S104.

When it is determined that it is necessary to add a problem, the conversation parameter learning module 101 returns to step S601.

When it is determined that it is not necessary to add a problem, the conversation parameter learning module 101 sets an initial value "1" to a variable "k" indicating an identification number of a problem for the first attribute and a variable "h" indicating an identification number of a problem for the second attribute (step S605).

Then, the conversation parameter learning module 101 determines whether or not there is a problem whose identification number is the variable "k" with reference to the biometric signal analysis information 316 of the conversation parameter of the first attribute (step S606). The process of step S606 is similar to the process of step S106.

When it is determined that there is a problem whose identification number is the variable "k", the conversation parameter learning module 101 generates the conversation parameter learning information 312 of the first attribute (step S607). The process of step S607 is the same as the process of step S107 but differ in the relational expression to be used. Here, a coefficient for calculating the empowerment parameter from the relational expression having the feature quantity and the number of ideas as variables is calculated.

The feature quantity of the empowerment parameter may be calculated using a pulse wave interval in a similar manner to the continuity parameter. Further, a feature point such as eyebrows, eyes, a mouth, or the like of a face may be set, a change in the feature point may be calculated from a face image as an expression parameter, and the parameter may be calculated as the feature quantity. Further, a sound quality such as a frequency of a voice may be used as the feature quantity.

Then, conversation parameter learning module 101 updates the variable "k" by adding 1 to the variable "k" (step S608), and then returns to step S606.

When it is determined in step S606 that there is no problem whose identification number is the variable "k," the conversation parameter learning module 101 determines whether or not there is a problem whose identification number is the variable "k" with reference to the biometric signal analysis information 316 of the conversation parameter of the first attribute (step S609). The process of step S609 is similar to the process of step S106.

When it is determined that there is a problem whose identification number is the variable "h", the conversation parameter learning module 101 generates the conversation parameter learning information 312 of the second attribute (step S610). The process of step S610 is the same as the process of step S107.

Then, the conversation parameter learning module 101 updates the variable "k" by adding 1 to the variable "h" (step S611), and then returns to step S609.

When it is determined in step S609 that there is no problem whose identification number is the variable "h," the conversation parameter learning module 101 ends the process.

Further, a formula indicating a relation between the feature quantity of the conversation parameter of each attribute and the value of the conversation parameter may be the same formula or a different formula.

In the second embodiment, the process executed by the conversation parameter calculating module 103 is partly different. Specifically, the process of step S304 is different.

The conversation parameter calculating module 103 calculates the conversation content in a similar manner to the first embodiment. Further, the conversation parameter calculating module 103 acquires the entry corresponding to the language signal searched in step S303 from the biometric signal information 315. The conversation parameter calculating module 103 calculates the value of the conversation parameter of each attribute using the conversation parameter learning information 312, the biometric signal, and the relational expression.

Further, in a case in which the biometric signal for calculating the continuity parameter is different from the biometric signal for calculating the empowerment parameter, and the identification numbers of the biometric signals are associated, the conversation parameter calculating module 103 acquires the corresponding biometric signals from the biometric signal information 315. In this case, the variable "j" may be updated in step S305. The above description is description of the process of step S304.

The present invention is not limited to the attribute of the conversation parameter calculated from the biometric signal. For example, only the empowerment parameter may be calculated from the biometric signal.

According to the second embodiment, it is possible to output the conversation information in view of the intellectual ability and the mental status which are difficult to evaluate from the language information, and thus the effective empowerment can be realized.

Third Embodiment

In a third embodiment, the computer 100 specifies the biometric signal associated with the conversation parameter and a feature quantity thereof on the basis of the conversation history information 311. Hereinafter, the third embodiment will be described focusing on a difference from the first embodiment.

Figure 23:
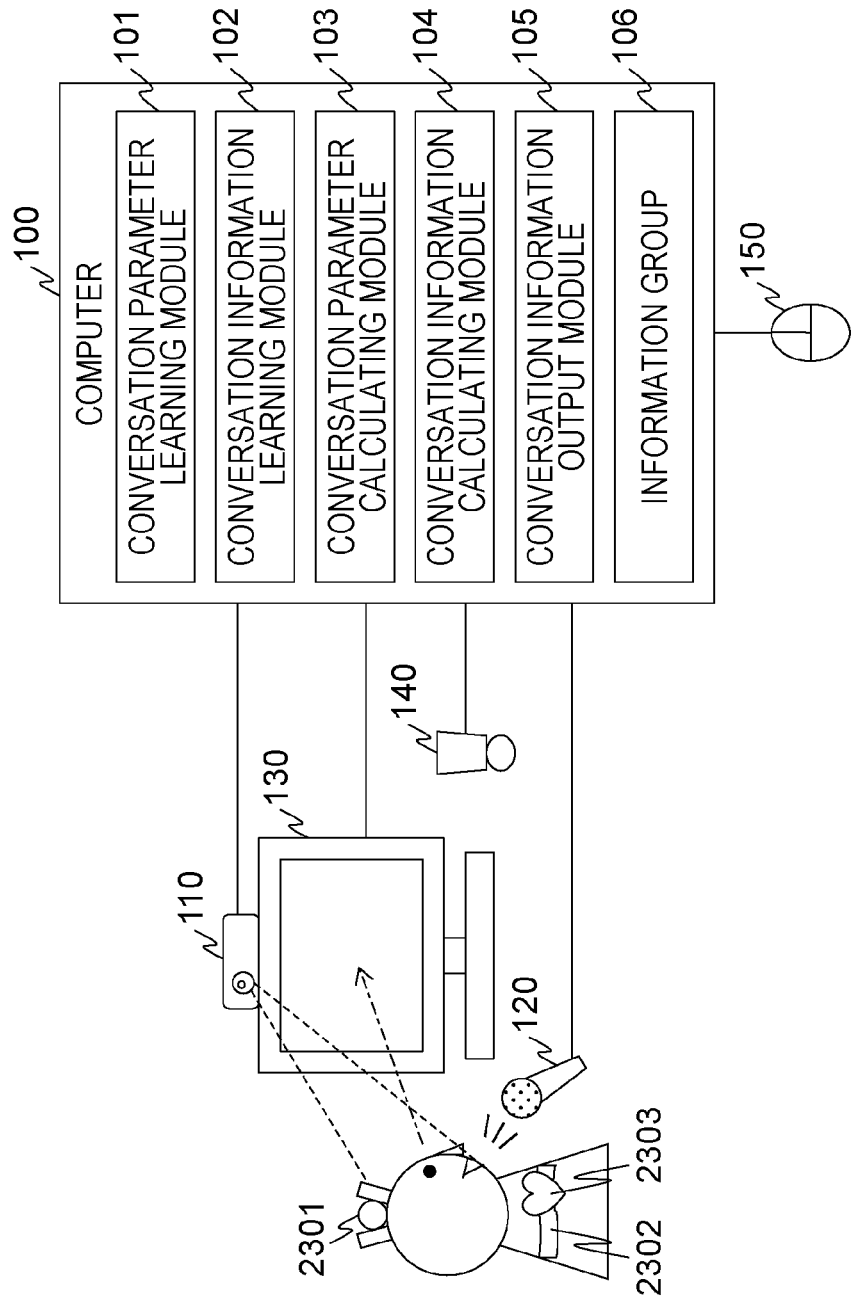
FIG. 23 is a diagram illustrating a configuration example of a system in which empowerment is performed according to a third embodiment.

In the third embodiment, the system configuration is partly different. FIG. 23 is a diagram illustrating a configuration example of a system in which the empowerment is performed according to the third embodiment.

In the third embodiment, the system includes various measuring devices in order to identify the biometric signal associated with the conversation parameter of an arbitrary attribute. Specifically, in addition to the biometric signal measuring device 110, the system of the third embodiment includes an electroencephalographic activity measuring device 2301 and autonomic nervous activity measuring devices 2302 and 2303.

In the third embodiment, various feature quantities associated with the conversation parameter of an arbitrary attribute are calculated from the measuring devices. For example, movement of a pupil is detected from a face image, and feature quantities such as a line-of-sight region, the number of jumps of a line of sight, an average pupil diameter, and a change in a pupil diameter are calculated. Feature quantities such as an utterance speed, a voice size, a voice height, and the like are calculated from a voice. Feature quantities of brain activities such as brain wave a wave power and a cerebral blood flow change are calculated from an electroencephalogram signal and a cerebral blood flow signal. Further, feature quantities of autonomic nervous activities such as a heartbeat interval, a respiratory phase (a rhythm of respiration), a breathing interval, and the like are calculated from a signal of a pulse or the like.

A hardware configuration and a software configuration of the computer 100 according to the third embodiment are the same as in the first embodiment. Here, a difference lies in fields of an entry included in the conversation history information 311. In the third embodiment, the entry includes a field for storing a measurement result for each biometric signal.

Processes executed by the conversation parameter learning module 101, the conversation parameter calculating module 103, the conversation information calculating module 104, and the conversation information output module 105 of the third embodiment are the same as in the first embodiment.

In the third embodiment, the conversation information learning module 102 analyzes the conversation history information 311 and specifies a relation between the feature quantity of each biometric signal and the conversation parameter of an arbitrary attribute. For example, a method of analyzing the conversation history information 311 on the basis of existing machine learning or the like may be used The preset invention is not limited to the method of analyzing the conversation history information 311.

In a case in which there are a plurality of feature quantities associated with the conversation parameter of an arbitrary attribute, the conversation information learning module 102 sets a feature quantity having the biggest influence on the change amount of the conversation parameter of the arbitrary attribute as a feature quantity for calculating the conversation parameter. At this time, a correlation of the feature quantities before learning may be deleted or may remain without change. Further, a combination of a plurality of feature quantities may be set, or a new feature quantity calculated from a plurality of feature quantities on the basis of a principal component analysis process or the like may be set.

A relational expression between the conversation parameter of each attribute before learning and the feature quantity of the signal may be managed using definition information. The definition information is updated by executing the learning process of the third embodiment.

According to the third embodiment, the conversation information learning module 102 can specify the correlation between the conversation parameter of each attribute and the feature quantity calculated from the biometric signal on the basis of the analysis result of the conversation history information 311. In other words, even in a case in which the correlation between the conversation parameter of each attribute and the biometric signal is not clear, an appropriate correlation can be specified by a learning process. On the basis of the correlation, the conversation information to be output is selected, and the conversation information and the selection algorithm are corrected, and thus the effective empowerment can be realized.

Fourth Embodiment

In the fourth embodiment, the computer 100 calculates a prediction time until the value of the conversation parameter reaches a target value on the basis of the target value of the conversation parameter of an arbitrary attribute. Hereinafter, the fourth embodiment will be described focusing on a difference from the first embodiment. In the following description, the conversation parameter in which the target value is set is also referred to as a "target parameter."

A system configuration and a hardware configuration of the computer 100 according to the fourth embodiment are the same as in the first embodiment.

In the fourth embodiment, a software configuration of the computer 100 is partly different. The computer 100 of the fourth embodiment stores aggregate conversation management information and prediction time definition information in addition to each pieces of information described in the first embodiment.

The aggregate conversation management information includes an entry configured with identification information of the user, a name and a target value of a target parameter, a start time of the empowerment, a value of the target parameter when the empowerment starts, the output conversation information, an output time of the conversation information, a value of the target parameter after the conversation information is output, and the like.

The prediction time definition information includes an entry configured with the name and a target value coefficient of the target parameter.

The conversation history information 311 may have a data format for managing the conversation information of a user unit. In this case, the entry of the conversation history information 311 includes fields constituting the entry of the aggregate conversation management information.

Processes executed by the conversation parameter learning module 101 and the conversation information calculating module 104 are the same as in the first embodiment.

In the fourth embodiment, the conversation information learning module 102 generates the prediction time definition information using the aggregate conversation management information after the process of step S208. Specifically, the following processing is executed.

The conversation information learning module 102 acquires a time taken until the value of the target parameter changes from a first value to a second value, the output conversation information, and the like for each the user with reference to the aggregate conversation management information. The first value is, for example, a minimum value of the target parameter, and the second value is, for example, a maximum value of the target parameter. The first value and the second value can be arbitrarily set.

The conversation information learning module 102 calculates a correlation between a difference between the first value and the second value and the time on the basis of the acquired information. The conversation information learning module 102 calculates the target value on the basis of the correlation. The correlation is given as an arbitrary formula, similarly to the first embodiment. The conversation information learning module 102 adds an entry in which the name and the target value coefficient of the target parameter are set in the prediction time definition information.

In the process described above, the user is not distinguished, but a similar process may be performed for each target user. In this case, the entry of the prediction time definition information includes a field for storing the identification information of the user.

In the fourth embodiment, the conversation parameter calculating module 103 acquires the target value of an arbitrary target parameter when the process starts. In the present embodiment, the target value of the empowerment parameter is acquired. The target value may be input by the user or may be set in advance. The remaining process is similar to that of the first embodiment.

In the fourth embodiment, the conversation information output module 105 calculates the prediction time taken until a value of a predetermined target parameter reaches the target value in step S501. Specifically, the conversation information output module 105 calculates a prediction time taken until it reaches the target value on the basis of a difference between the target value and the value of the target parameter before the target value is output, the target value coefficient, and the correlation calculated by the conversation information learning module 102. The conversation information output module 105 generates the output information including the prediction time.

In the fourth embodiment, the conversation information output module 105 outputs the output information including the prediction time to the user.

According to the fourth embodiment, since it is possible to enhance the motivation of the user and adjust the empowerment execution schedule, the effective empowerment can be realized.

Fifth Embodiment

In a fifth embodiment, a graphical user interface (GUI) for performing a setting on the computer 100 and a GUI displayed on the basis of the output information in each embodiment will be described.

Figure 24:
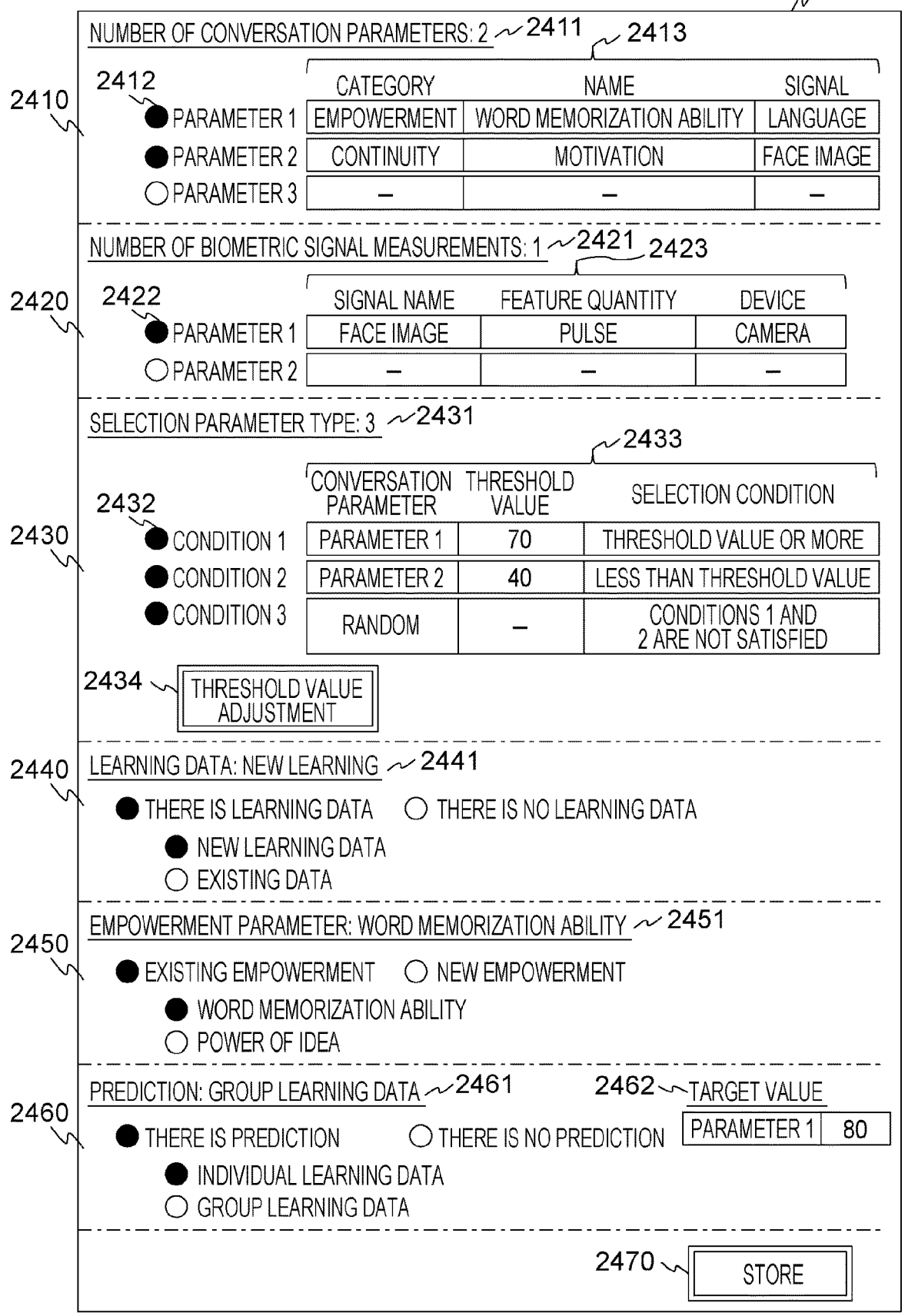
FIG. 24 is a diagram illustrating an example of a GUI for performing setting in a computer according to a fifth embodiment.

FIGS. 24 and 25 are diagrams illustrating an example of a GUI for performing a setting on the computer 100 according to the fifth embodiment.

A GUI 2400 illustrated in FIG. 24 includes a conversation parameter setting field 2410, a biometric signal setting field 2420, a selection parameter setting field 2430, a learning data setting field 2440, an empowerment setting field 2450, a prediction time setting field 2460, and a save button 2470.

The conversation parameter setting field 2410 is a field for setting the conversation parameter, and includes a conversation parameter number display field 2411, a radio button 2412, and a setting field group 2413. The conversation parameter number display field 2411 is a field for displaying the number of conversation parameters to be calculated. The radio button 2412 is a button operated when the conversation parameter is set. An input to the setting field group 2413 can be performed by operating the radio button 2412. The setting field group 2413 is a field group for setting an attribute and a name of the conversation parameter and a name of a signal used for calculation of the value of the conversation parameter. Fields other than those described above may be included in the setting field group 2413.

The biometric signal setting field 2420 is a field for setting the biometric signal, and includes a biometric signal number display field 2421, a radio button 2422, and a setting field group 2423. The biometric signal number display field 2421 is a field for displaying the number of biometric signals to be measured. The radio button 2422 is a button operated when the biometric signal is set. An input to the setting field group 2423 can be performed by operating the radio button 2422. The setting field group 2423 is a field group for setting a name of a biometric signal, a name of a feature quantity to be calculated from the biometric signal, and a name of a device for measuring the biometric signal. Fields other than those described above may be included in the setting field group 2423.

The selection parameter setting field 2430 is a field for setting the selection parameter and an algorithm such as a selection criterion for the selection parameter and includes a selection parameter number display field 2431, a radio button 2432, a setting field group 2433, and a threshold value adjustment button 2434. The selection parameter number display field 2431 is a field for displaying the number of selection parameters. The radio button 2432 is a button operated when the selection parameter, the selection criterion for the selection parameter, and the like are set. An input to the setting field group 2433 can be performed by operating the radio button 2432. The setting field group 2433 is a field group for setting the name of the conversation parameter to be set in the selection parameter, a threshold value serving as the selection criterion, and the selection condition. Fields other than those described above may be included in the setting field group 2433. The threshold value adjustment button 2434 is a button operated when a GUI 2500 for adjusting the threshold value illustrated in FIG. 25 is switched.

The learning data setting field 2440 is a field for setting the learning method for determining the method of calculating the conversation parameter and includes a learning method display field 2441 and a setting radio button group. It is possible to set the learning method by operating the setting radio button group. In the present embodiment, a radio button for selecting the presence or absence of learning data and a radio button for selecting learning data to be used are included. An operation result for the setting radio button group is displayed in the learning method display field 2441.

The empowerment setting field 2450 is a field for setting the empowerment parameter and includes an empowerment parameter display field 2451 and a setting radio button group. It is possible to set the empowerment parameter by operating the setting radio button group. In the present embodiment, a radio button for selecting either of an existing empowerment parameter and a new empowerment parameter is included. An operation result for the setting radio button group is displayed in the empowerment parameter display field 2451.

The prediction time setting field 2460 is a field for setting whether or not the prediction time is calculated and includes a predicted display field 2461, a setting radio button group, and a target value setting field 2462. The setting radio button group includes a radio button for selecting whether or not the prediction time is set. Further, the setting radio button group includes a field for selecting a type of learning data necessary for calculating the prediction time. An operation result for the setting radio button group is displayed in the predicted display field 2461. The target value setting field 2462 is a field for setting a target value to be used when the prediction time is calculated and includes a field for setting the name and the target value of the conversation parameter set in the target parameter.

The save button 2470 is a button operated when an input of each setting field is stored.

The GUI 2500 illustrated in FIG. 25 includes an empowerment display field 2501, a selection parameter display field 2502, a selection condition display field 2503, a threshold value display field 2504, a graph display field 2505, a fitting method display field 2506, a fitting method setting field 2507, a range output display field 2508, and a range output setting field 2509.

The empowerment display field 2501 is a field for displaying the purpose of the empowerment.

The selection parameter display field 2502 is a field for displaying the name of the selection parameter for setting the threshold value.

The selection condition display field 2503 is a field for displaying the selection condition of the selection parameter.

The threshold value display field 2504 is a field for displaying the threshold value used for the selection condition for the selection parameter.

The graph display field 2505 is a field for displaying a graph to be referenced to for setting the threshold value. In FIG. 25, a graph for setting the threshold value for selecting the empowerment parameter as the selection parameter is displayed. A vertical axis of the graph indicates the change amount of the empowerment parameter, and a horizontal axis indicates a value of an in-conversation continuity parameter. The graph illustrated in the graph display field 2505 corresponds to the graph 1604 in FIG. 16. The administrator is able to correct the threshold value while referring to the graph display field 2505.

The fitting method display field 2506 is a field for displaying the setting result of the fitting method setting field 2507.

The fitting method setting field 2507 is a field for setting the fitting method. The fitting method setting field 2507 includes a radio button group for selecting the fitting method.

The range output display field 2508 is a field for displaying the setting result for the range output setting field 2509.

The range output setting field 2509 is a field for setting a range which is a condition for deciding the threshold value. The range output setting field 2509 includes a radio button group for setting the range.

Figure 26A:
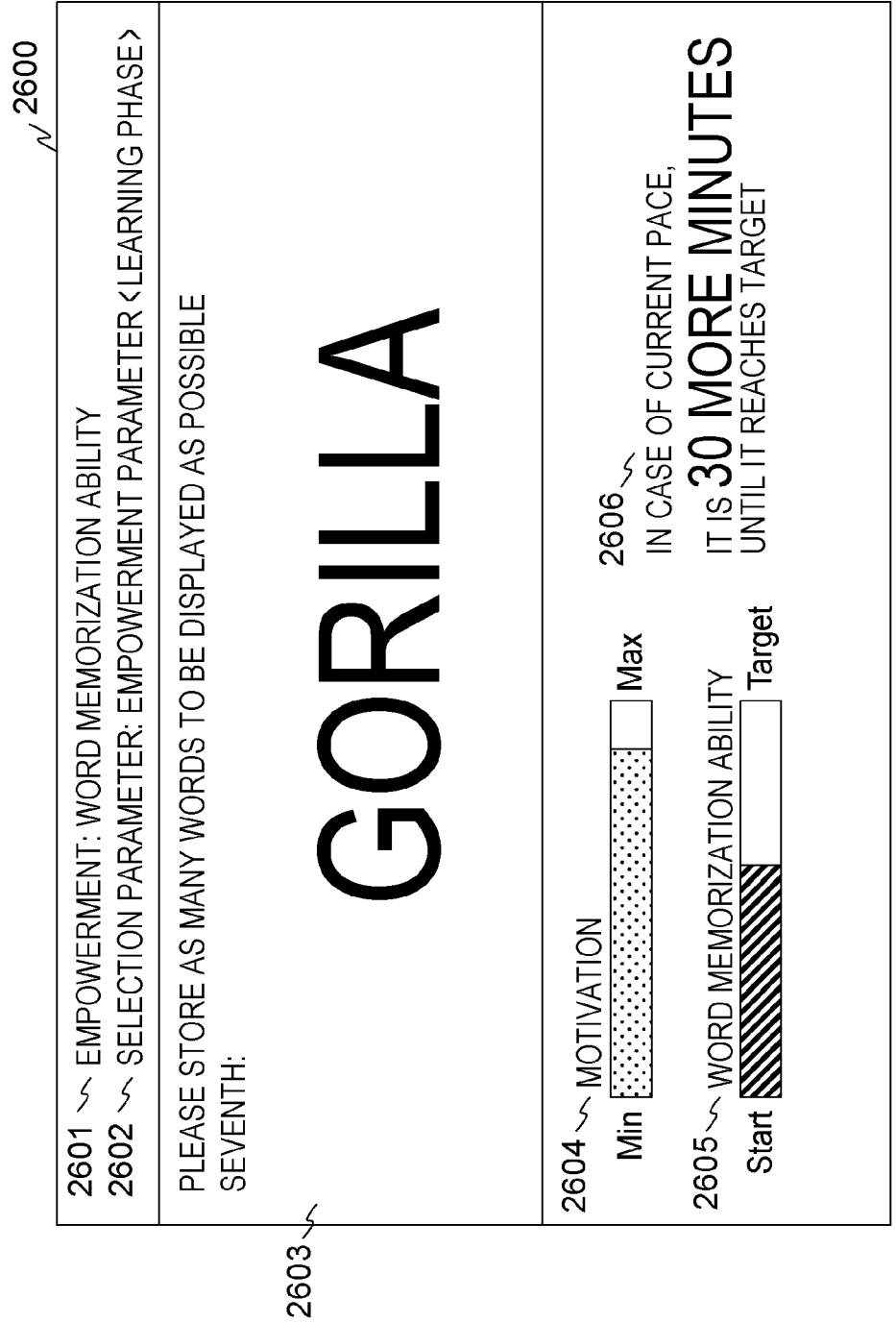
FIG. 26A is a diagram illustrating an example of a GUI displayed on the basis of output information or the like output by the computer according to the fifth embodiment.

FIGS. 26A and 26B are diagrams illustrating an example of a GUI displayed on the basis of the output information or the like output by the computer 100 of the fifth embodiment.

FIG. 26A illustrates a GUI displayed when the empowerment is executed. A GUI 2600 includes an empowerment display field 2601, a selection parameter display field 2602, a conversation information display field 2603, a continuity parameter display field 2604, an empowerment parameter display field 2605, and a prediction time display field 2606.

The empowerment display field 2601 is a field for displaying the purpose of the empowerment.

The selection parameter display field 2602 is a field for displaying the name of the selection parameter used when the conversation information is selected.

The conversation information display field 2603 is a field for displaying the conversation information.

The continuity parameter display field 2604 is a field for displaying the name of the continuity parameter and a value of a current continuity parameter. In FIG. 26A, the value of the continuity parameter is displayed in a graph form. A numerical value may be displayed.

The empowerment parameter display field 2605 is a field for displaying the name of the empowerment parameter and a value of a current empowerment parameter. In FIG. 26A, the value of the empowerment parameter is displayed in a graph form. A numerical value may be displayed.

The prediction time display field 2606 is a field for displaying the prediction time taken until the value of the target parameter reaches the target value.

FIG. 26B illustrates a GUI displayed for checking a temporal change in the conversation parameter or the like during the execution of the empowerment. A GUI 2610 includes an empowerment display field 2611, a selection parameter display field 2612, a conversation information display field 2613, a graph display field 2614, and a prediction time display field 2615. The empowerment display field 2611, the selection parameter display field 2612, the conversation information display field 2613, and the prediction time display field 2615 are the same as the empowerment display field 2601, the selection parameter display field 2602, the conversation information display field 2603, and the prediction time display field 2606.

The graph display field 2614 is a field for displaying a graph indicating the temporal change in the conversation parameter of each attribute. In FIG. 26B, a graph indicating a temporal change in the value of the empowerment parameter and a graph indicating a temporal change in the value of the continuity parameter are displayed together. The graph may be displayed for each attribute of the conversation parameter. A chain line shown in the graph of FIG. 26B indicates the threshold value of the empowerment parameter, and an alternate long and short dashed line indicates the threshold value of the continuity parameter.

The present invention is not limited to the above embodiments but includes various modified examples. For example, the above embodiments have been described in detail in order to help with understanding with the present invention and are not necessarily limited to a configuration including all the described components. Further, some of the components of the embodiment can be added, deleted, or replaced with other components.

Furthermore, some or all of components, functions, processing units, processing devices, or the like described above may be implemented by hardware, for example, may be designed by an integrated circuit. Further, the present invention may be implemented by a software program code for implementing the functions of the embodiment. In this case, a storage medium including the program code stored therein is provided to a computer, and a CPU of the computer reads out the program code stored in the storage medium. In this case, the program code read out from the storage medium implements the functions of the above embodiments, and the program code and the storage medium storing the program code therein constitute the present invention. Examples of the storage medium for supplying the program code include a flexible disk, a CD-ROM, a DVD-ROM, a hard disk, a solid state drive (SSD), an optical disk, a magneto-optical disk, a CD-R, a nonvolatile memory card, and a ROM.

Further, the program code for implementing the functions described in the present embodiment can be implemented in a wide range of programs or scripting languages such as an assembler, C/C++, perl, Shell, PHP, and Java (a registered trademark).

Furthermore, the program code of the software for implementing the functions of the embodiment may be delivered via a network and stored in a storage device such as a hard disk or a memory of a computer or a storage medium such as a CD-RW or a CD-R, and a CPU installed in the computer may read and execute the program code stored in the storage device or the storage medium.

Furthermore, in the above-described embodiment, a control line or an information line are illustrated since they are necessary for description, and all control lines or information lines necessary in a product are not necessarily illustrated. All the components may be connected to one another.

What is claimed is:

1. A system in which empowerment is performed by outputting conversation information to the user, comprising:
   a computer including a processor, a memory, and an interface; and
   a measuring device that measures signals of a plurality of types,
      wherein the computer includes a selection algorithm for deciding conversation information to be output for each of a plurality of attribute conversation parameters for evaluating the state of the user who performs the empowerment,
      wherein the processor calculates values of conversation parameters of a plurality of attributes for evaluating a state of a user who performs the empowerment on the basis of a plurality of signals measured by the measuring device,
      the processor selects a selection parameter, which is a conversation parameter of a change target, and is selected on the basis of selection policy information and the values of the conversation parameters of the plurality of attributes,
      wherein the computer holds selection policy information for selecting the selection parameter, the selection policy information includes a reference threshold value for the values of the conversation parameters of the plurality of attributes which is a selection criterion for the selection parameter,
      the processor decides the conversation information for changing a value of the selection parameter by using the selection algorithm corresponding to the selection parameter, and
      the processor outputs the decided conversation information to the user.

2. The system according to claim 1,
   wherein the computer holds conversation history information in which the values of the conversation parameters of the plurality of attributes, the selection parameter, and the conversation information to be output to the user are associated,
   the processor analyzes a correlation between the conversation parameters of the plurality of attributes and a correlation between the conversation parameters of the plurality of attributes and the conversation information to be output to the user, and
   the processor updates the reference threshold value for each of the conversation parameters of the plurality of attributes on the basis of a result of the analysis.

3. The system according to claim 2,
   wherein the processor generates new conversation information of each of the conversation parameters of the plurality of attributes on the basis of the result of the analysis and updates the selection algorithm.

4. The system according to claim 3,
   wherein the conversation parameters of the plurality of attributes include an empowerment parameter for evaluating an intellectual power and a mental status of the user and a continuity parameter for evaluating a continuation desire of the user for the empowerment.

5. The system according to claim 1,
   wherein the computer holds definition information indicating a relation between a time and a change amount in a conversation parameter of a first attribute for the conversation parameter of the first attribute,
   the processor receives an input of a target value of the conversation parameter of the first attribute,
   the processor calculates a prediction time taken until a value of the conversation parameter of the first attribute reaches a target value on the basis of the definition information, the target value of the conversation parameter of the first attribute, and a current value of the conversation parameter of the first attribute, and
   the processor outputs the conversation information including the prediction time to the user.

6. A conversation information output method in a system in which empowerment is performed by outputting conversation information to a user, the system including a computer including a processor, a memory, and an interface and a measuring device that measures signals of a plurality of types, the conversation information output method comprising:
   a first step of calculating, by the processor, values of conversation parameters of a plurality of attributes for evaluating a state of a user who performs the empowerment on the basis of a plurality of signals measured by the measuring device;
   a second step of selecting, by the processor, a selection parameter which is a conversation parameter of a change target, and is selected on the basis of the selection policy information and the values of the conversation parameters of the plurality of attributes;
   a third step of deciding, by the processor, conversation information for changing a value of the selection parameter by using a selection algorithm corresponding to the selection parameter; and
   a fourth step of outputting, by the processor, the decided conversation information to the user,
      wherein the computer includes the selection algorithm for deciding the conversation information to be output for each of a plurality of attribute conversation parameters for evaluating the state of the user who performs the empowerment,
      wherein the computer holds selection policy information for selecting the selection parameter, and
      wherein the selection policy information includes a reference threshold value for the values of the conversation parameters of the plurality of attributes which is a selection criterion for the selection parameter.

7. The conversation information output method according to claim 6,
   wherein the computer holds conversation history information in which the values of the conversation parameters of the plurality of attributes, the selection parameter, and the conversation information to be output to the user are associated, and
   the conversation information output method further comprises
   a step of analyzing, by the process, a correlation between the conversation parameters of the plurality of attributes and a correlation between the conversation parameters of the plurality of attributes and the conversation information to be output to the user, and
   a step of updating, by the process, the reference threshold value for each of the conversation parameters of the plurality of attributes on the basis of a result of the analysis.

8. The conversation information output method according to claim 7, further comprising:
   a step of generating, by the processor, new conversation information of each of the conversation parameters of the plurality of attributes on the basis of the result of the analysis and updates the selection algorithm.

9. The conversation information output method according to claim 8,
wherein the conversation parameters of the plurality of attributes include an empowerment parameter for evaluating an intellectual power and a mental status of the user and a continuity parameter for evaluating a continuation desire of the user for the empowerment.

10. The conversation information output method according to claim 6,
wherein the computer holds definition information indicating a relation between a time and a change amount in a conversation parameter of a first attribute for the conversation parameter of the first attribute,
the first step includes a step of receiving, by the processor, an input of a target value of the conversation parameter of the first attribute, and
the fourth step includes
a step of calculating, by the processor, a prediction time taken until a value of the conversation parameter of the first attribute reaches a target value on the basis of the definition information, the target value of the conversation parameter of the first attribute, and a current value of the conversation parameter of the first attribute, and
a step of outputting, by the processor, the conversation information including the prediction time to the user.

* * * * *